United States Patent
Iqbal et al.

(10) Patent No.: US 8,180,007 B2
(45) Date of Patent: May 15, 2012

(54) METHOD FOR CLOCK AND DATA RECOVERY

(75) Inventors: Asif Iqbal, Allahabad (IN); Girraj K. Agrawal, Noida (IN); Ankit Pal, Ghaziabad (IN)

(73) Assignee: Freescale Semiconductor, Inc., Austin, TX (US)

( * ) Notice: Subject to any disclaimer, the term of this patent is extended or adjusted under 35 U.S.C. 154(b) by 358 days.

(21) Appl. No.: 12/687,844

(22) Filed: Jan. 14, 2010

(65) Prior Publication Data
US 2011/0170644 A1    Jul. 14, 2011

(51) Int. Cl.
*H04L 7/00* (2006.01)

(52) U.S. Cl. ........ 375/355; 375/316; 375/340; 375/354; 375/360; 370/503; 370/508; 370/509; 370/510; 370/511; 370/512; 370/513; 370/514; 455/502; 327/141; 713/375

(58) Field of Classification Search ............... 375/316, 375/340, 354, 355, 360; 370/503, 508, 509, 370/510, 511, 512, 513, 514; 455/502; 327/141; 713/375
See application file for complete search history.

(56) References Cited

U.S. PATENT DOCUMENTS

| | | | |
|---|---|---|---|
| 6,035,409 A | 3/2000 | Gaudet | |
| 7,180,966 B2 * | 2/2007 | Vallet et al. | 375/340 |
| 7,198,197 B2 | 4/2007 | Best | |
| 7,292,662 B2 | 11/2007 | Gregorius | |
| 2005/0207520 A1 * | 9/2005 | Su et al. | 375/355 |
| 2009/0327788 A1 * | 12/2009 | Balamurugan et al. | 713/375 |

* cited by examiner

Primary Examiner — Leon Flores
(74) Attorney, Agent, or Firm — Charles Bergere

(57) ABSTRACT

An input bit stream including a clock signal and data bits is oversampled to obtain one or more sets of data samples. One or more sets of non-transitioning phases corresponding to data samples that do not switch between zero and one are then identified. Center phases corresponding to the one or more sets of non-transitioning phases are identified and then a final center phase that accurately represents the bits belonging to the input bit stream is selected. The data samples corresponding to the final center phase are extracted, thereby recovering the clock signal and data bits from the input bit stream.

20 Claims, 14 Drawing Sheets

METHOD FOR CLOCK AND DATA RECOVERY

BACKGROUND OF THE INVENTION

The present invention relates generally to serial data transmission, and, more specifically, to the recovery of a clock signal and data bits from a serial data bit stream at an asynchronous serial interface receiver.

Recently, there has been a consistent rise in the use of the serial data transmission technology in digital data transmission. Several industries are undergoing a transition from parallel to high-speed serial interfaces to reduce system costs, simplify system design, and provide scalability to provide higher bandwidths. An important advantage that serial interfaces provide is lower pin counts per connection. As a result, more input/output (I/O) channels can be implemented on one integrated circuit (IC) chip as compared to parallel data transmission. This reduces the cost per I/O channel in an IC. Serial data transmission also allows fabrication of smaller IC packages having fewer ICs, less traces, and smaller board area and/or PCB layers. Recently, serial data transmission has become capable of delivering data transmission speeds in the range of 2-10 Gbps. Additionally, serial interfaces provide higher clock rates than other interfaces due to the use of asynchronous data transfer with embedded clock, full duplex point-to-point connection and some technological advances in the Physical Layer (PHY) signaling such as low-voltage differential signaling, 8 b/10 b encoding and pre-emphasis (signal equalization).

Several emerging data transmission standards, such as MPHY by Mobile Industry Processor Interface (MIPI), Serial AT Attachment (SATA), Universal Serial Bus (USB) 3.0, Peripheral Component Interconnect (PCI) Express, 1 GB and 10 GB Ethernet, RapidIO, and Fiber Channel, have serial data transmission as their core technology. These interfaces are widely used in various market segments such as in all facets of telecommunications, optical transceivers, data and storage networks, wireless products, and computing systems in general.

A serial data transmission system transmits data bits sequentially over a transmission channel. Generally, a serial data transmission system includes a transmitter module, a receiver module, and a transmission channel. The transmitter module transmits data serially over the transmission channel without an accompanying clock signal. The receiver module receives the serial data stream, recovers the serially transmitted data from the received serial data stream, and performs a serial-to-parallel conversion. The serial-to-parallel conversion results in parallel data streams that enable the receiver module to operate at lower frequencies than the serial data rate. The transmitter and receiver modules may be part of a wide area network or implemented as integrated circuits located on a single circuit board or on two different circuit boards or two IP blocks within the same chip. The transmission channel may be a communication satellite link, a fiber optic cable, back plane connectivity, chip-to-chip interconnection or connectivity inside a chip.

During serial data transmission, the transmitter module converts the parallel data into serial data by time-division multiplexing the data bits. Each data bit sent over the transmission channel is represented as a pulse of a predetermined time period of a high or low voltage level. The switching between the high and low voltage levels occurs in synchronization with a clock signal local to the transmitter module. However, due to scarcity of resources, the clock signal is not transmitted to the receiver module. Thus, in order to recover data from the serial data stream, the receiver module detects bit boundaries using clock and data recovery schemes such as phase adjustment (phase alignment) and phase picking.

In the phase adjustment scheme, a phase locked loop (PLL) is used to adjust the sampling instant to the signal eye center of the received signal. This method of data recovery entails the usage of a digital phase detector, which calculates a phase angle between an input signal and the clock signal. As digital phase detectors are edge sensitive circuits and the received input signal is distorted due to interference with various unavoidable effects in the transmission channel, the digital phase detectors may lead to incorrect calculation of the phase angle, which is a disadvantage of the phase adjustment scheme. The occurrence of the above-mentioned inaccuracy may be suppressed with an inert control system. An inert control system prevents immediate unlocking of the PLL. However, incorrect calculation of the phase angle leads to a reduction in the jitter budget even when using an inert control system. Thus, for the same BER (Bit Error Rate), the received data signal needs to have a larger signal eye opening when using a PLL based phase adjustment (phase alignment) clock and data recovery scheme.

In the phase picking scheme, the serial data stream is sampled at a frequency higher than the frequency of the transmitter module clock signal. Alternatively, the sampling is done using multiple phases of a reference clock signal local to the receiver module. The multiple phases are obtained by phase shifting the reference clock signal by a phase angle that depends upon a predefined count of multiple phases to be obtained. The sampling of the data stream generates a plurality of data samples corresponding to one clock cycle width of the reference clock signal at the receiver module. Thereafter, the data samples corresponding to a phase of the reference clock signal that represents the transmitted data bits more correctly as compared to other phases are selected. The data samples are selected based on an assumption that the data bits span for equal time periods and that each data bit spans for an equal count of phases of the reference clock signal. If an eye diagram is plotted of an ideal data stream, bit transitions will lie at a particular phase of the reference clock signal. On the other hand, if there is jitter in the received data stream or sampling phases of the reference clock signal, the bit transitions will be spread around a particular phase of the reference clock signal. The shorter the bit transition spread, the better the existing methods work for calculating the phase for sampling the received data stream, thereby resulting in low bit error rate (BER).

However, in actuality due to the non-ideal nature of the transmitter module and the transmission channels, some received data bits may become prolonged and some data bits may become shortened as compared to the ideal bit width. As the speeds of serial interfaces increase, the ratio of bit width of prolonged bits and shortened bits increases. For serial interfaces that work at high speed, a shortened bit can become less than 50% of its ideal width and an elongated bit can become more than 150% of its ideal width. This effect can cause a spread of distribution of bit transitions of the received data bit stream throughout the eye opening, resulting in a very narrow eye opening or an almost closed eye. Existing methods for clock and data recovery fail in such cases of widely distributed bit transitions. This shortcoming will be explained in more detail below with reference to FIG. 2B.

Many of the above stated shortcomings of the conventional phase alignment scheme are overcome by the phase picking scheme. Since the stability constraints are absent, the phase picking scheme achieves a very high bandwidth. However, the phase picking decision is prone to latency due to the involvement of lengthy calculations.

FIG. 1 is a timing diagram 100 illustrating generation of multiple phases for an 8× oversampling scheme. The timing diagram 100 includes a reference clock signal 102, and phase signals 104a, 104b, 104c, and 104d. The phase signals 104a, 104b, 104c, and 104d correspond to phase 0 (ph0), phase 1 (ph1), phase 3 (ph3) and phase 7 (ph7) respectively. Phases 2, 4, 5, and 6 are not shown for simplicity and clarity.

The reference clock signal 102 is provided to a multiple-clock generation unit that generates the phase signals 104a, 104b, 104c, and 104d from the reference clock signal 102. When the count of phases generated is 8, each of the multiple phases is shifted from one another by 360°/8=45°. Similarly, mutual phase angles between different phase signals may be calculated for different counts of phases to be generated.

Referring now to FIG. 2A, a timing diagram 200a depicting sampling of an input bit stream is shown. The timing diagram 200a includes the waveforms corresponding to an input bit stream 202a. The input bit stream 202a is pre-encoded by a transmitter using the 8 b/10 b encoding scheme or any other encoding scheme that ensures a minimum and sufficient number of transitions in the input bit stream 202a. The input bit stream 202a includes a waveform 204a and a waveform 204b. The timing diagram 200a further includes accumulated phase transitions 206a, and phases 208a, 208b, 208c, 208d, 208e, 208f, 208g, and 208h corresponding to phases 0-7 of the reference clock signal 102 (FIG. 1) respectively.

The input bit stream 202a includes received data bits Rbit0, Rbit1 Rbit2, and so on. It may be observed that the received data bits Rbit0-Rbit9 have equal bit widths. Therefore, all the received data bits span an equal number phases i.e., 8. For example, the waveform 204a that corresponds to received data bit Rbit2, spans 8 phases. It may be further observed that all the bit transitions occur at phase 208a. Therefore, phase 208a is the transition phase.

Referring now to FIG. 2B, a timing diagram 200b depicting sampling of an input bit stream 202b is shown. The timing diagram 200b includes the waveforms corresponding to the input bit stream 202b. The timing diagram 200b also includes a waveform 204c, a waveform 204d, a waveform 204e, and accumulated phase transitions 206b.

The input bit stream 202b includes received data bits such as Rbit0, Rbit1, Rbit2, and so on and is similar to the input bit stream 202a of FIG. 2A. The input bit stream 202b is sampled using the phases of the reference clock signal 102 (FIG. 1) such as phases 208a-208h to obtain multiple data samples of each data bit in the input bit stream 202b. The received data bit Rbit5 corresponding to the waveform 204d is a shortened bit since it spans only 2 phases, i.e., the phases 208b and 208c. Further, the received data bit Rbit6 corresponding to the waveform 204e is an elongated bit since it spans eleven phases. Additionally, it may be observed that the received data bit Rbit2 corresponding to the waveform 204c is of normal length since it spans 8 phases.

The obtained data samples are stored in a memory for further processing. Subsequent to the data sample collection, an average transition phase is calculated based on the transitions between two consecutive phases. The average transition phase represents a phase corresponding to one in which the number of bit transitions is highest or the probability of occurrence of bit transitions is highest. Thereafter, a final center phase is identified by adding a fixed offset or a statistically calculated offset to the average transition phase. The fixed offset is added such that the final center phase obtained has the least probability of occurrence of bit transitioning as it is farthest from the average transition phase. Subsequently, the data samples corresponding to the final center phase are extracted. For example, in FIG. 2A it may be observed that phase 208a i.e., ph0 is the phase in which all bit transitions happen. Hence phase 208a may be identified as the average transition phase. Thereafter, an offset of four phases may be added to phase 208a to identify phase 208e (phase 0+4=phase 4) as the final center phase. Then, the data samples corresponding to phase 208e are extracted.

In an example from FIG. 2B, the accumulated phase transitions 206b shows that there are bit transitions at phases 208a, 208d, 208g and 208h. Like the example shown in FIG. 2A, if phase 208a is identified as the average transition phase using the most transitioning phase criterion and an offset of four phases is added, then phase 208e is identified as the final center phase. As can be seen from the timing diagram 200b, if phase 208e is identified as the final center phase, the received data bit corresponding to the waveform 204d is skipped as it is a shortened data bit. Instead, the value of the received data bit corresponding to the waveform 204e is extracted twice. Such erroneous final center phase estimation leads to a high BER. Additionally, subsequent to the addition of offset to the average center phase transition, the final center phase thus obtained may be one of the transition phases. For example, if phase 3 (phase 208d) is selected as an average transition phase, then the final center phase is calculated by adding an offset of 4 phases to phase 3 to obtain phase 7 (phase 208h) as the final center phase. FIG. 2B shows that phase 7 is a transitioning phase. This will further increase the BER. However, high speed serial interfaces, such as MIPI-MPHY, USB 3.0, SATA, and PCI Express, have very low BER ($10^-12$) requirements.

Further, the accumulated phase transitions 206b show that phases 208b and 208c, and phases 208e and 208f do not include a transition in any of the waveforms that represent the received data bits. Therefore, the final center phase is selected from either the phases 208b and 208c or the phases 208e and 208f. If either of phases 208b or 208c is selected as the final center phase, the values of the received data bits corresponding to the waveforms 204c, 204d, and 204e are obtained correctly.

Additionally, defects, such as clock jitter, band limitation of the communication channels, and Inter Symbol Interference (ISI), may reduce the effective usable eye opening to almost 0 percent and distribute the bit transitions throughout the eye. This may further result in the failure of the existing statistical clock and data recovery methods. Accordingly, it would be advantageous to be able to recover a clock signal and data bits from a serial bit stream reliably and with a low BER.

BRIEF DESCRIPTION OF THE DRAWINGS

The following detailed description of the preferred embodiments of the present invention will be better understood when read in conjunction with the appended drawings. The present invention is illustrated by way of example, and not limited by the accompanying figures, in which like references indicate similar elements.

DETAILED DESCRIPTION OF THE INVENTION

Figure 1:
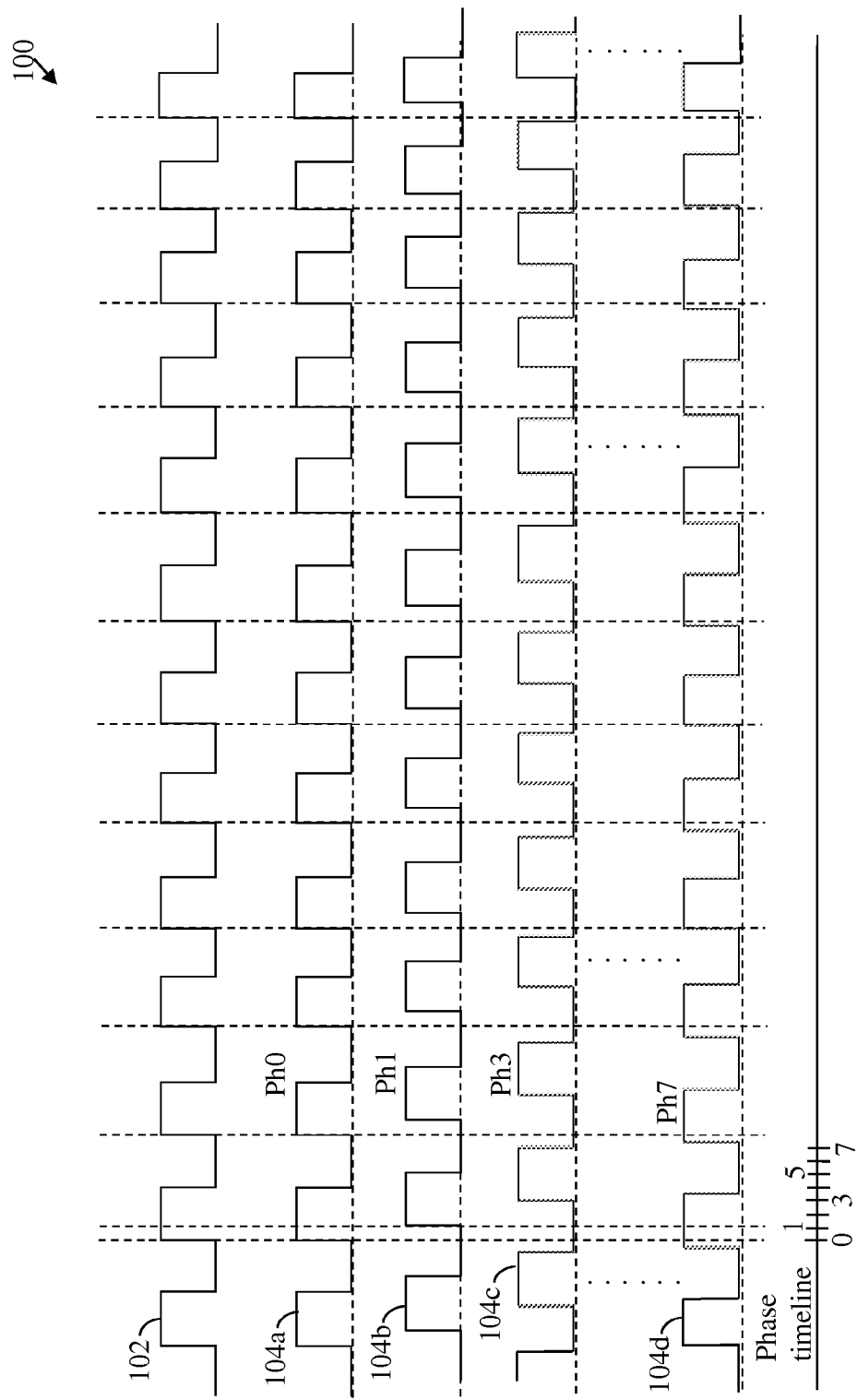
FIG. 1 is a timing diagram illustrating generation of multiple phases of a reference clock used for data sampling.

The detailed description of the appended drawings is intended as a description of the currently preferred embodiments of the present invention, and is not intended to represent the only form in which the present invention may be practiced. It is to be understood that the same or equivalent functions may be accomplished by different embodiments that are intended to be encompassed within the spirit and scope of the present invention.

In an embodiment of the present invention, a method for recovering clock and data from an input bit stream is provided. The input bit stream is received and oversampled to obtain one or more sets of data samples. The oversampling is performed using a plurality of phases of a reference clock signal. Subsequent to the oversampling of the received input bit stream, one or more sets of non-transitioning phases corresponding to the data samples that do not switch between binary zero and binary one are identified and then one or more center phases corresponding to the one or more sets of non-transitioning phases are identified.

One or more bit-wise transition vectors are calculated corresponding to the identified one or more center phases. The one or more bit-wise transition vectors are compared with one or more predefined bitmasks. A final center phase is selected from the center phases based on the comparison of the bit-wise transition vectors with one or more predefined bitmasks. The data is recovered by extracting the data samples corresponding to the selected final center phase.

In another embodiment of the present invention, a method for recovering data from an input bit stream is provided. The input bit stream is received and oversampled to obtain one or more sets of data samples. The oversampling is performed using a plurality of phases of a reference clock signal such that each set of data samples corresponds to one bit width of received data belonging to the received input bit stream. Additionally each set of data samples comprises a received data bit or contiguous portions of more than one received data bits corresponding to one bit duration of the received data. Subsequent to the oversampling of the received input bit stream, one or more sets of non-transitioning phases are identified. The sets of non-transitioning phases corresponding to the data samples that do not switch between zero and one are identified. Thereafter, one or more center phases corresponding to the one or more sets of non-transitioning phases are identified. The identification of the center phase for each set of non-transitioning phases is done on the basis of the count of non-transitioning phases associated with that set of non-transitioning phases, which provides one center phase that corresponds to each set of non-transitioning phases.

One or more final center phases that were selected in one or more previous clock and data recovery cycles are identified. An average center phase is calculated based on the identified one or more final center phases of previous clock and data recovery cycles. A set of non-transitioning phases is identified from the one or more sets of non-transitioning phases of current clock and data recovery cycle based on the calculated average center phase of previous clock and data recovery cycles. The center phase of the identified set of non-transitioning phases is selected as a final center phase. Finally, data is recovered by extracting the data samples corresponding to the selected final center phase.

In yet another embodiment of the present invention, a method for recovering clock and data from an input bit stream is provided. The input bit stream is received and oversampled to obtain one or more sets of data samples. The oversampling is performed using a plurality of phases of a reference clock signal such that each set of data samples corresponds to one bit width of a received data belonging to the received input bit stream. Additionally, each set of data samples comprises a received data bit or contiguous portions of more than one received data bit corresponding to one bit duration of the received data. Subsequent to the oversampling of the received input bit stream, one or more sets of non-transitioning phases are identified. The sets of non-transitioning phases corresponding to data samples that do not switch between zero and one are identified. One or more center phases corresponding to the one or more sets of non-transitioning phases are identified. The identification of the center phases is based on the count of non-transitioning phases associated with the one or more sets of non-transitioning phases such that each center phase corresponds to a set of non-transitioning phases.

One or more bit-wise transition vectors are calculated corresponding to the identified one or more center phases. The calculation of the one or more bit-wise transition vectors is performed based on the transition of the data samples that are associated with each center phase between binary zero and binary one. Further, one or more final center phases that were selected in one or more previous clock and data recovery cycles are identified. An average center phase is calculated based on the identified one or more final center phases of previous clock and data recovery cycles. A final center phase is selected from the identified one or more center phases of current data recovery cycle based on a predefined criteria. Subsequently, data is recovered by extracting the data samples corresponding to the selected final center phase.

In another embodiment of the present invention, a receiver system includes a sampling unit for receiving an input bit stream and oversampling the received input bit stream. The oversampling is performed using a plurality of phases of a reference clock signal such that each set of data samples corresponds to one bit width of a received data belonging to the received input bit stream. Each set of data samples comprises a received data bit or contiguous portions of more than one received data bits corresponding to one bit duration of the received data. The receiver system further includes a serial-to-parallel data converter connected to the sampling unit. The serial-to-parallel data converter converts a serial stream of the one or more sets of data samples into parallel streams of sets of data samples.

The receiver system includes a clock and data recovery unit connected to the serial-to-parallel data converter. The clock and data recovery unit recovers the clock and data from the parallel streams of sets of data samples. The clock and data recovery unit includes a memory for storing the parallel streams of sets of data samples. The clock and data recovery unit also includes a non-transitioning phase identification unit connected to the memory. The non-transitioning phase identification unit identifies one or more sets of the non-transitioning phases corresponding to data samples that do not switch between binary zero and binary one. A center phase identification unit, connected to the non-transitioning phases identification unit, identifies the one or more center phases corresponding to one or more sets of non-transitioning phases. A center phase for each set of non-transitioning phases is identified on the basis of the count of non-transitioning phases associated with that set of non-transitioning phases. Thus one center phase for each set of non-transitioning phases is identified. The clock and data recovery unit further includes a bit-wise transition vector calculation unit that is connected to the center phase identification unit and the memory. The bit-wise transition vector calculation unit identifies the one or more bit-wise transition vectors corresponding to the identified one or more center phases. The identification of the bit-wise transition vector for each center phase is performed based on switching of the data samples associated with the center phases between binary zero and binary one. Thus one bit-wise vector for each identified center phase is obtained.

The clock and data recovery unit includes a final center phase selection unit that is connected to the bit-wise transition vector calculation unit. The final center phase selection unit selects a final center phase from the identified one or more center phases for recovering clock and data. Additionally, the clock and data recovery unit includes a data recovery unit connected to the final center phase selection unit. The data recovery unit recovers data by extracting the data samples corresponding to the selected final center phase.

Various embodiments of the present invention provide a method for recovering clock and data from an input bit stream at the receiver. The method for clock and data recovery entails recovering clock and data corresponding to a final center phase. Alternative methods of selecting the final center phase are disclosed. The first method includes oversampling the input bit stream to obtain one or more sets of data samples. The oversampling is performed using a plurality of phases of a reference clock signal such that each data sample corresponds to a phase of the reference clock signal. Thereafter, sets of non-transitioning phases corresponding to the data samples that do not switch between zero and one are identified. In addition, center phases corresponding to sets of non-transitioning phases are identified. Subsequently, bit-wise transition vectors are identified based on the transition of the data samples associated with the center phases. The bit-wise transition vectors are compared with predefined bitmasks to select a final center phase corresponding to which data are recovered.

If the final center phase is not selected by the above described first method, a second method is performed. The second method includes identification of a set of non-transitioning phases with the maximum count of non-transitioning phases. The center phase corresponding to the selected set of non-transitioning phases is selected as a final center phase. However, if the final center phase is not selected by the above described second method, a third method is performed. The third method includes calculation of an average center phase. The average center phase is calculated based on one or more final center phases selected in the previous clock and data recovery cycles. A set of non-transitioning phases in the current clock and data recovery cycle is selected based on the calculated average center phase of the previous clock and data recovery cycles. Subsequently, a center phase corresponding to the identified set of non-transitioning phases above is selected as the final center phase. However, if the final center phase is not selected by the above described third method, i.e., the calculated average center phase does not lie in any of the set of non-transitioning phases, a fourth method is used in which the calculated average center phase is selected as the final center phase. In the four methods mentioned above for selecting a center phase, data is recovered corresponding to the final center phase.

The described method for recovering clock and data is capable of extracting clock and data from the input bit stream in noisy environments. The four methods mentioned above are serially executed in such a manner that a subsequent method is executed each time an ongoing method fails and is not able to find the final center phase. This strategy enables clock and data recovery even in worst scenarios when accumulated eye is almost closed, for example, in the presence of jitter, band limitation of the transmission channels, ISI, and asymmetric rise time and fall time of the transmitter and receiver module components. The calculation of the bit-wise transition vectors and their comparison with predefined bit-masks enables identification of the final center phase that is contained in the received input data stream which has shortened/elongated bits such as Rbit 5 of FIG. 2B, which is a shortened bit and Rbit 6, which is an elongated bit. Additionally, the usage of the four methods mentioned above enable accurate data recovery from the input bit stream in the presence of reflections and crosstalk between the transmission channels. It should be apparent to persons skilled in the art that the problem of shortened/elongated bits is due to the asymmetric nature of rise time and fall times of the transmitter and receiver module components and the transmission channel. As it may be noticed from FIG. 2B that presence of shortened/elongated bits in the input data stream creates multiple sets of non-transitioning phases. The method of calculating bit-wise transition vectors for each set of non-transitioning phases and the comparison of the bit-wise transition vector with predefined bitmasks selects the set of non-transitioning phases which includes the shortened bit. Center phase corresponding to this selected set of non-transitioning phase is selected as a final center phase. Data thus extracted corresponding to this final center phase does not skip shortened, elongated, normal bits in the input stream. The described method recovers accurate data even when the eye opening is reduced to 0%. Thus, the described method reduces the BER, which is a critical parameter for high-speed serial interfaces, such as MIPI-MPHY, USB 3.0, SATA, and PCI Express.

Figure 2A:
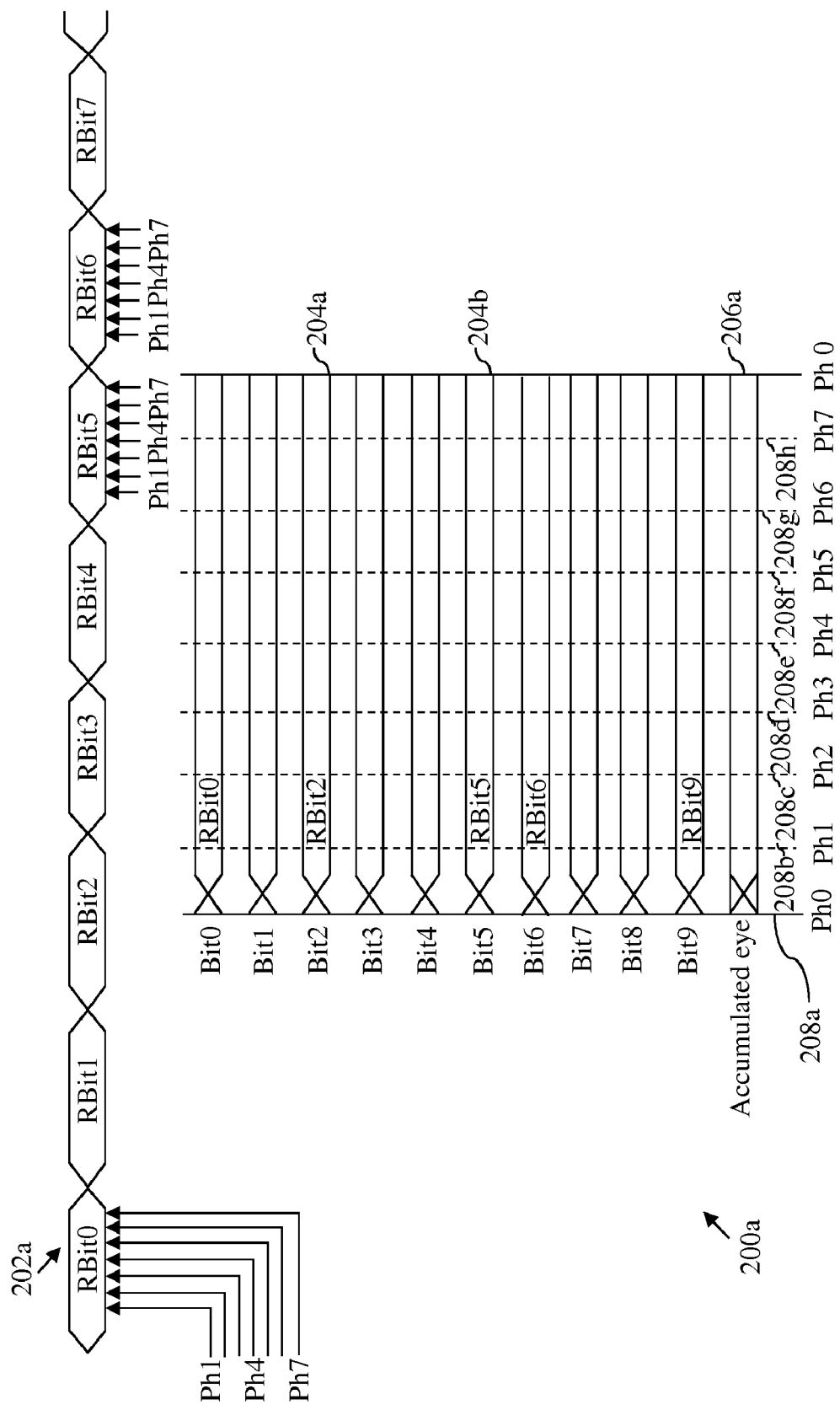
FIG. 2A is timing diagram illustrating sampling of an input bit stream.
Figure 2B:
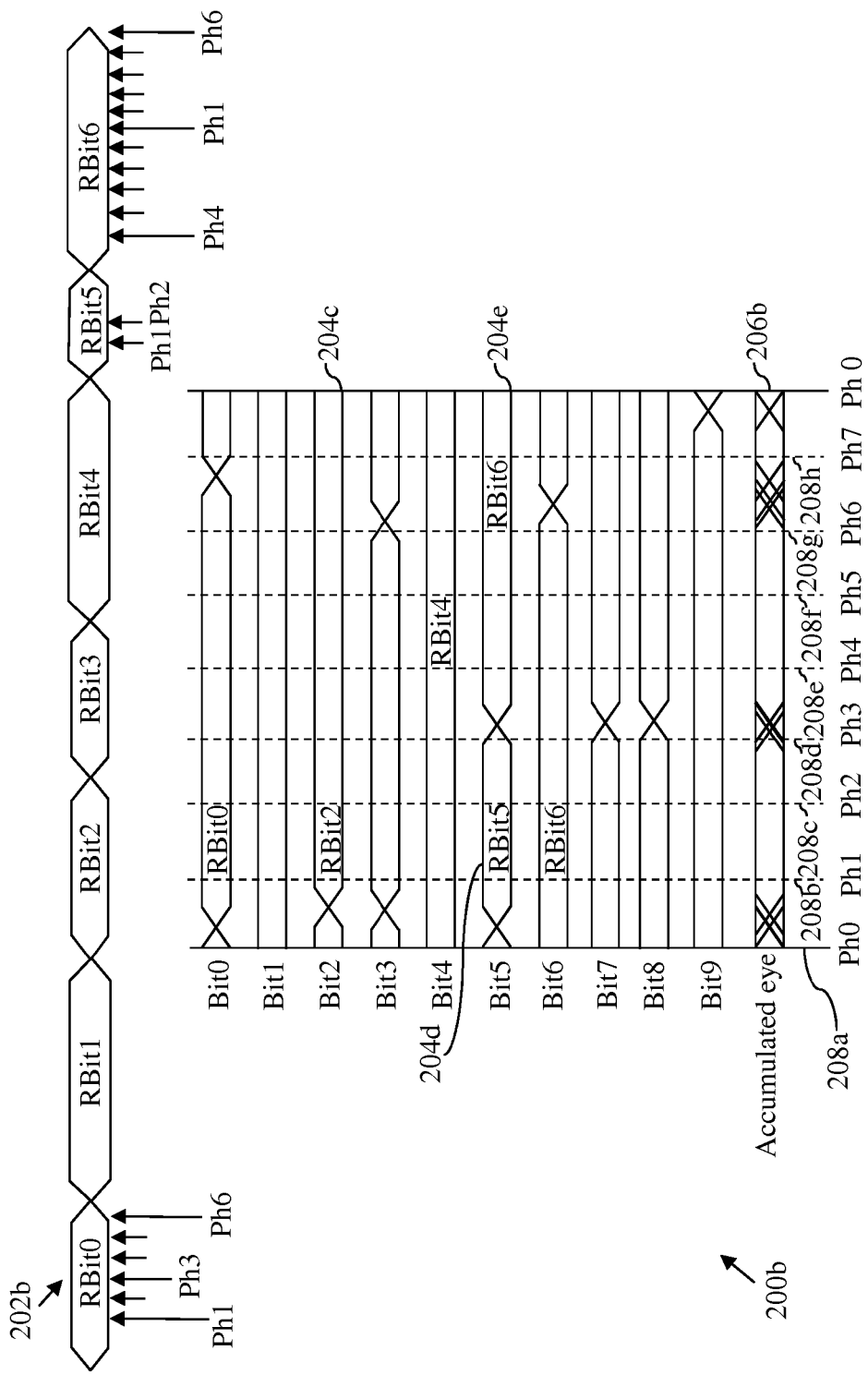
FIG. 2B is timing diagram illustrating sampling of shortened and elongated bits.
Figure 3:
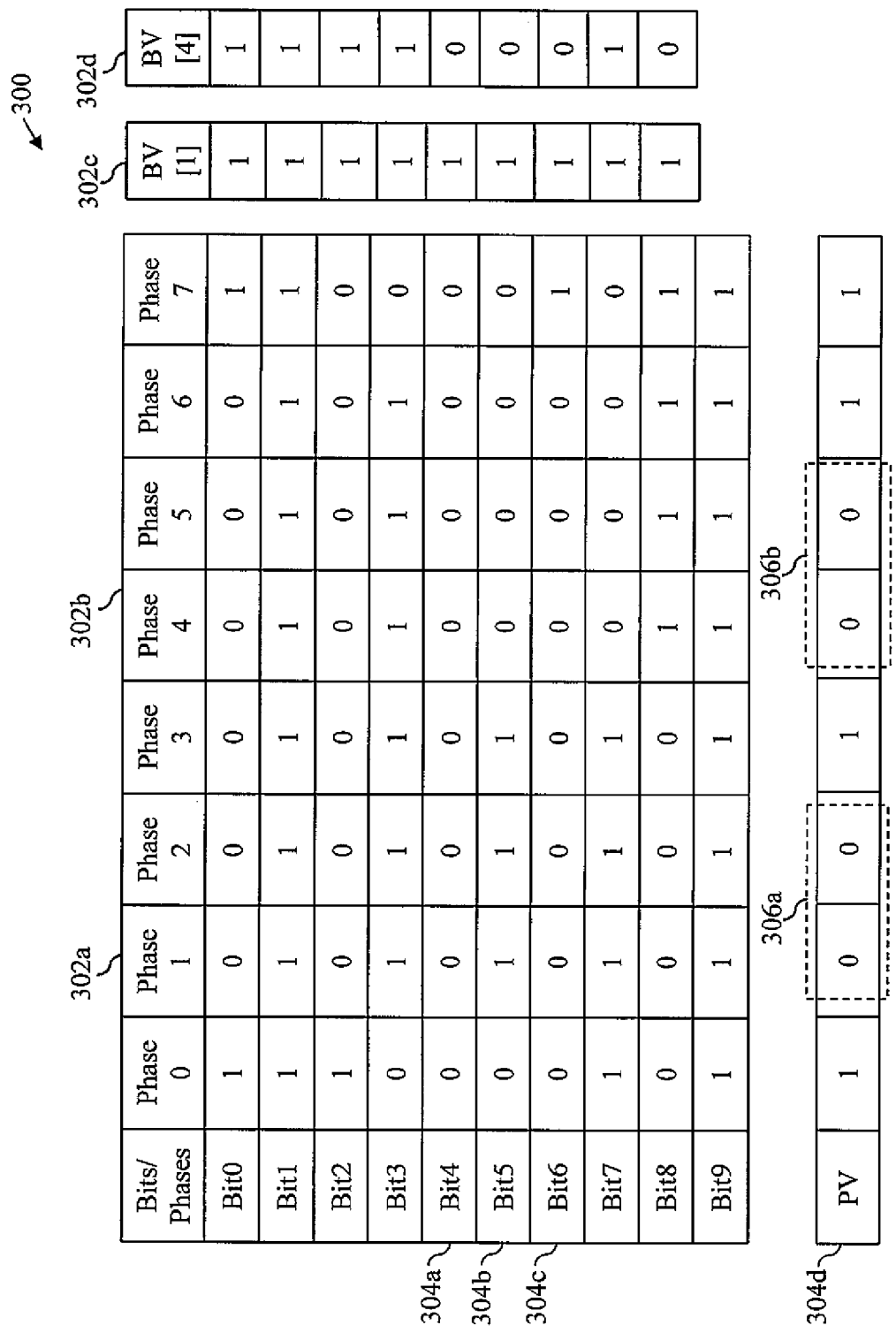
FIG. 3 is a data sample matrix in accordance with an embodiment of the present invention.

Referring now to FIG. 3, a data sample matrix 300 is shown. The data sample matrix 300 includes the columns corresponding to phase 0 to phase 7, and rows corresponding to Rbit 0 to Rbit 9 of the input bit stream 202*b*. Additionally, the data sample matrix 300 includes columns corresponding to a bit-wise transition vector (BV [1]) that corresponds to phase 1, a bit-wise transition vector (BV [4]) that corresponds to phase 4, and a row corresponding to a phase-wise transition vector (PV). Further, phase 0 to phase correspond to the phases of FIG. 2B, for example, phase 208*a* corresponds to phase 0 of the data sample matrix 300. The data sample matrix 300 includes columns 302*a*, 302*b*, 302*c*, and 302*d*, rows 304*a*, 304*b*, 304*c*, and 304*d*, and sets of non-transitioning phases 306*a* and 306*b*. Hereinafter, the set of non-transitioning phases will also be referred to as non-transitioning zone. Column 302*a* corresponds to phase 1, column 302*b* corresponds to phase 4, column 302*c* is a bit-wise transition vector corresponding to phase 1 and column 302*d* is a bit-wise transition vector corresponding to phase 4. Row 304a corresponds to bit 4, row 304b corresponds to bit 5, row 304c corresponds to bit 6, and row 304d corresponds to a phase-wise transition vector. Further, phase 1 is a center phase for the non-transitioning zone 306a and phase 4 is a center phase for the non-transitioning zone 306b.

Various cells of the data sample matrix 300 include data samples obtained after oversampling the input bit stream 202b using phases (phase 0 to phase 7) of the reference clock signal 102. For example, the cell corresponding to column 302a and row 304a includes a sampled value of the input bit stream 202b corresponding to phase 1 and bit 4. It may be seen from the data sample matrix 300 that the sampled value of bit 0 when sampled using phase 208b is '0'.

Column 302c is a bit-wise transition vector calculated corresponding to a particular center phase. For example, column 302c is calculated corresponding to phase 1. The calculation of the bit-wise transition vector and the phase-wise transition vector is explained in detail in conjunction with FIG. 4A.

Figure 4A:
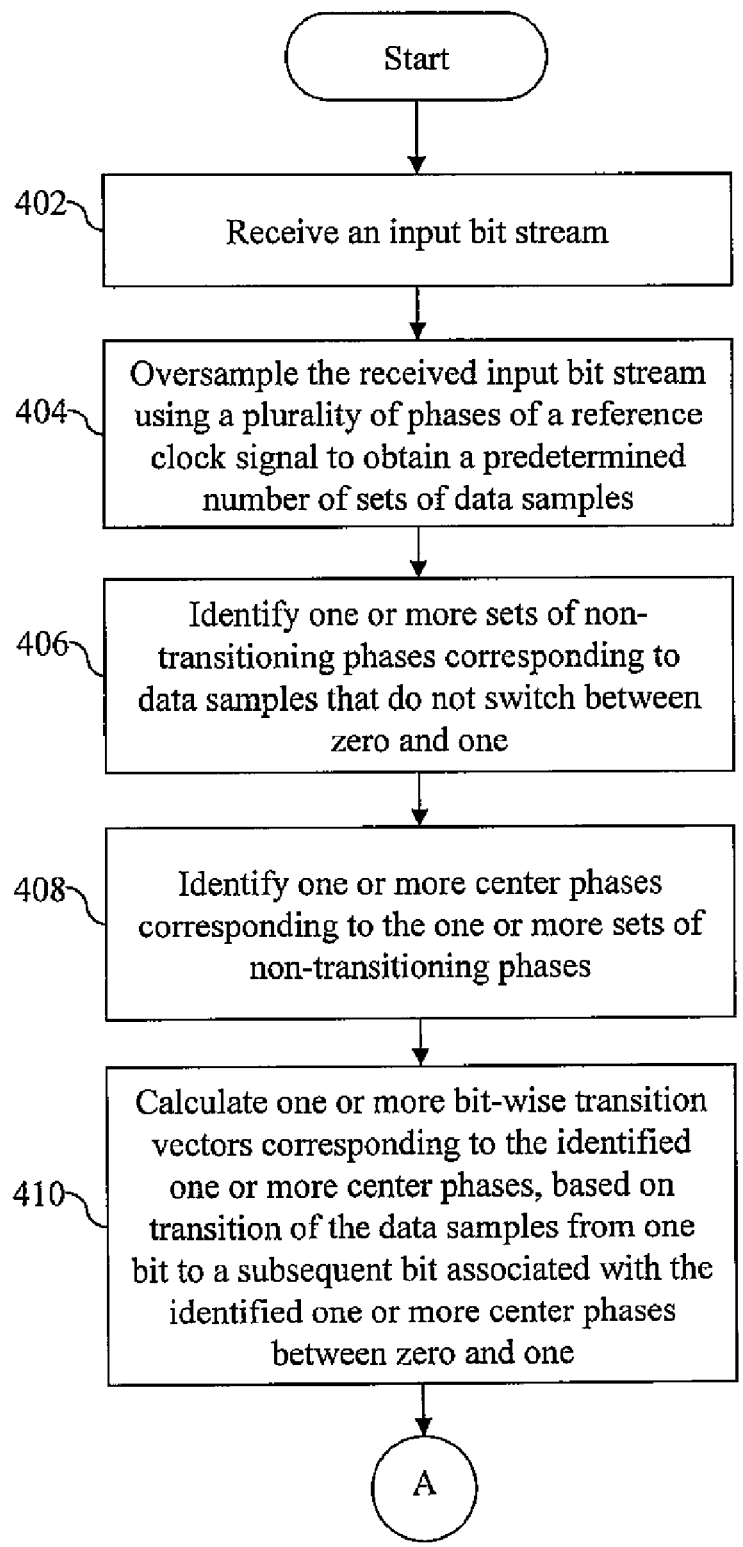
FIGS. 4A and 4B are flowcharts illustrating a method for recovering clock and data from an input bit stream in accordance with an embodiment of the present invention.
Figure 4B:
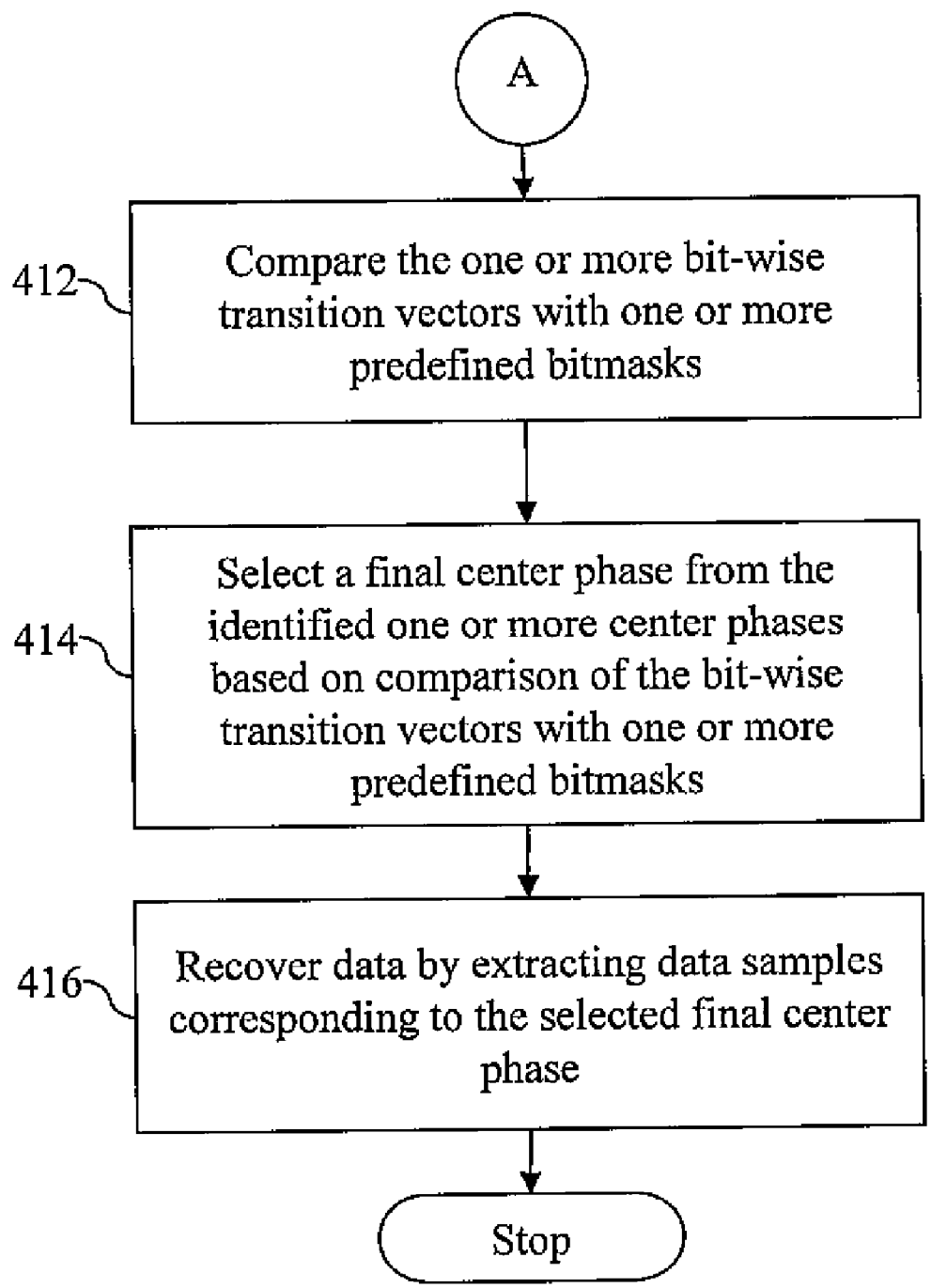

Referring now to FIGS. 4A and 4B, a flowchart illustrating a method for recovering clock and data from an input bit stream are shown, in accordance with an embodiment of the present invention. At step 402, an input bit stream is received. The input bit stream includes received data bits ordered serially. The input bit stream may be encoded using an 8 b/10 b encoding scheme or any other encoding scheme that ensures minimum and sufficient number of transitions in the input bit stream. An exemplary input bit stream 202b is shown in FIG. 2B. In an embodiment of the present invention, a transmitter serializes the data bits and transmits them to a receiver. The input bit stream is transmitted over a transmission channel. At step 404, the received input bit stream is oversampled at the receiver to obtain one or more sets of data samples, in which a set of data samples corresponds to one bit width of a received data belonging to the received input bit stream. Again, referring to FIGS. 2 and 3, the input bit stream 202b is oversampled to obtain a set of data samples containing eight (8) samples corresponding to one bit width of the received data belonging to the received input bit stream. The obtained set of data samples is such that each set of data samples includes a received data bit or contiguous portions of more than one received data bits corresponding to one bit duration of the received data. Further, the oversampling is performed continuously to obtain sets of data samples corresponding to ten (10) bit width duration of the received data, viz., Rbit-Rbit 9. In an embodiment of the present invention, the multiple phases of the reference clock signal may be generated using a delayed locked loop (DLL) or a phase locked loop (PLL), or a phase interpolator, or a combination of these, as they provide correct phase shift to the high frequency reference clock signal to generate the multiple phases that are subsequently used for oversampling. For example, for four phase oversampling, 90° phase shift will be provided. In an embodiment of the present invention, the reference clock signal 102 is a high frequency signal having a frequency of 5 GHz.

The sets of data samples obtained are stored in a memory in the form of a data sample matrix (refer to FIG. 3). At step 406, one or more sets of non-transitioning phases are identified from the data sample matrix. The identification of non-transitioning zones may be performed using information from a phase-wise transition vector. Referring again to FIG. 3, in which row 304d is the phase-wise transition vector, each cell value of row 304d indicates if any bit transition has occurred from the phase corresponding to the cell to the subsequent phase. The cell values may be calculated using the following expression:

PV[0]=[(bit0,phase0) XOR (bit0,phase1)] OR [(bit1, phase0) XOR (bit1,phase1)] OR [(bit2,phase0) XOR (bit2,phase1)] OR ... [(bit9,phase0) XOR (bit9,phase1)].

If the value of PV=0, then none of bit0-bit9 has changed values from the corresponding phase to the subsequent phase. Similarly, if PV=1, then at least one of the bits has changed value from the corresponding phase to the subsequent phase. Similarly, PV[7]=[(bit0,phase7) XOR (bit0,phase0)] OR [(bit1,phase7) XOR (bit1,phase0)] OR [(bit2,phase7) XOR (bit2,phase0)] OR ... [(bit9,phase7) XOR (bit9,phase0)]. Each non-transitioning zone includes the consecutive phases corresponding to data samples that do not switch between binary zero and binary one from one phase to subsequent phase. Additionally, each non-transitioning zone includes the consecutive phases whose corresponding cell values of the PV are zero. Therefore, the phase-wise transition vector located in row 304d includes two non-transitioning zones. The first non-transitioning zone includes phases 1 and 2; the second non-transitioning zone includes phases 4 and 5.

At step 408, one or more center phases corresponding to the one or more non-transitioning zones are identified. The identification of a center phase is performed based on the count of non-transitioning phases present in a non-transitioning zone. Each center phase corresponds to one non-transitioning zone. The center phase may be identified by using the following expression:
Suppose the count of non-transitioning phases in $i^{th}$ non-transitioning zone is $N_i$.
The beginning phase of the non-transitioning zone is phase $M_i$.

$$\text{Center phase } C_i = \text{phase } M_i + (N_i - 1)/2 \quad N_i \text{ is odd \& } N_i \geq 1$$

$$= \text{phase } M_i + (N_i - 2)/2 \quad N_i \text{ is even \& } N_i > 1$$

Where, i=an integer between 1 and count of non-transitioning zones
For example, referring to FIG. 3 again, the center phase corresponding to the first zone of the data sample matrix 300 may be calculated using the expression above in the following manner:
Given $N_i$=2

$C_i$=phase 1+(2−2)/2

Therefore, $C_i$=phase 1
Similarly, the center phase for the second non-transitioning zone is identified to be phase 4.

At step 410, one or more bit-wise transition vectors corresponding to the identified one or more center phases are calculated. A bit-wise transition vector captures transitions from one bit to subsequent bit in a particular phase for ten (10) data bits. The bit-wise transition vector is used to locate a shortened bit in one of the possible non-transitioning zones, thus eliminating the non-transitioning zones that do not have a shortened bit. Thereafter data is recovered from a center phase that captures the value of the shortened bit. For example, the center phases corresponding to the non-transitioning zones present in the data sample matrix 300 are phase 1 and phase 4. Referring to FIG. 3 again, in which column 302c includes bit-wise transition vector corresponding to phase 1, each cell value corresponding to column 302c indicates if a transition occurred from that bit to the next bit corresponding to phase 1. The cell values may be calculated using the following expression:

BV[1] [0]=[(bit0,phase1) XOR (bit1,phase1)], BV[1] [1]=[(bit1,phase1) XOR (bit2,phase1)], and so forth.

The following are the bit-wise transition vectors obtained corresponding to phases 1 and 4 using the expression mentioned above.

BV[1]=[1,1,1,1,1,1,1,1,1] BV[4]=[1,1,1,1,0,0,0,1,0]

In an embodiment of the present invention, the bit-wise transition vectors obtained above may be arranged in a bit-wise transition matrix as illustrated below:

| $BV[1]$ | 1 | 1 | 1 | 1 | 1 | 1 | 1 | 1 | 1 |
|---|---|---|---|---|---|---|---|---|---|
| $BV[4]$ | 1 | 1 | 1 | 1 | 0 | 0 | 0 | 1 | 0 |

At step 412, the one or more bit-wise transition vectors are compared with one or more predefined bitmasks.

At step 414, a final center phase is selected from the identified center phases. The selection of the final center phase is performed based on the comparison of the bit-wise transition vectors with one or more predefined bitmasks. Examples of predefined bitmasks for a 2×9 bit-wise transition matrix (similar to the bit-wise transition matrix illustrated above) may include:

| 1 | 1 |
|---|---|
| 0 | 0 |

Bitmask-1

| 0 | 0 |
|---|---|
| 1 | 1 |

Bitmask-2

The bitmasks above are compared with 2×2 sub-matrices obtained from the 2×9 bit-wise transition matrix illustrated above. For example, sub-matrix-1 obtained from the first two left most columns of 2×9 bit-wise transition matrix will be as follows:

| 1 | 1 |
|---|---|
| 1 | 1 |

Similarly, sub-matrix-2 obtained from the second and third columns (counting from left) of 2×9 bit-wise transition matrix will be as follows:

| 1 | 1 |
|---|---|
| 1 | 1 |

Likewise, sub-matrix-5 obtained from the fifth and sixth columns (counting from left) of 2×9 bit-wise transition matrix will be as follows:

| 1 | 1 |
|---|---|
| 0 | 0 |

Likewise, sub-matrix-8 obtained from the eight and ninth columns (counting from left) of 2×9 bit-wise transition matrix will be as follows:

| 1 | 1 |
|---|---|
| 1 | 0 |

Similarly, remaining sub-matrices (sub-matrix-3, 4, 6, and 7) may be obtained.

These bitmasks capture the '101' or '010' bit pattern embedded in the columns of data samples wherein the particular column of the data samples correspond to the center phase of one of the non-transitioning zone obtained previously. Simultaneously, these bitmasks capture '111' or '000' bit patterns embedded in the column of data samples wherein the particular column of the data samples correspond to the center phase of the other non-transitioning zone. It can be seen that these bit masks capture and locate an embedded short bit in data samples. The centre phase which contains such short bit is selected as final centre phase. In summary, these two bit masks have captured a shortened '0' and a shortened '1' bit by scanning '101' and '010' pattern respectively. Referring to the example in previous paragraph, the bitmask-1 matches with sub-matrix-5 (illustrated above). Therefore, it may be inferred that the first row (BV[1]) of the bit-wise transition matrix matches with the bitmask. Since, the first row of the bit-wise transition matrix corresponds to phase 1, phase 1 is selected as the final center phase. In an embodiment of the present invention, when comparing three bit-wise transition vectors arranged as a 3×9 bit-wise transition matrix, three bitmasks of the order of 3×2 may be used.

At step 416, data is recovered by extracting the data samples corresponding to the final center phase selected. For example, phase 1 is selected as the final center phase for the data sample matrix 300. Thereafter, the data samples corresponding to the final center phase will be extracted from the data sample matrix 300. The data samples recovered corresponding to phase 1 are located in column 302*a*. It can be seen that the final center phase selected includes waveform 204*d*, which is a shortened bit, in addition to waveforms of other received data bits such as received bits 204*c* and 204*e*, thereby recovering data accurately.

Figure 5A:
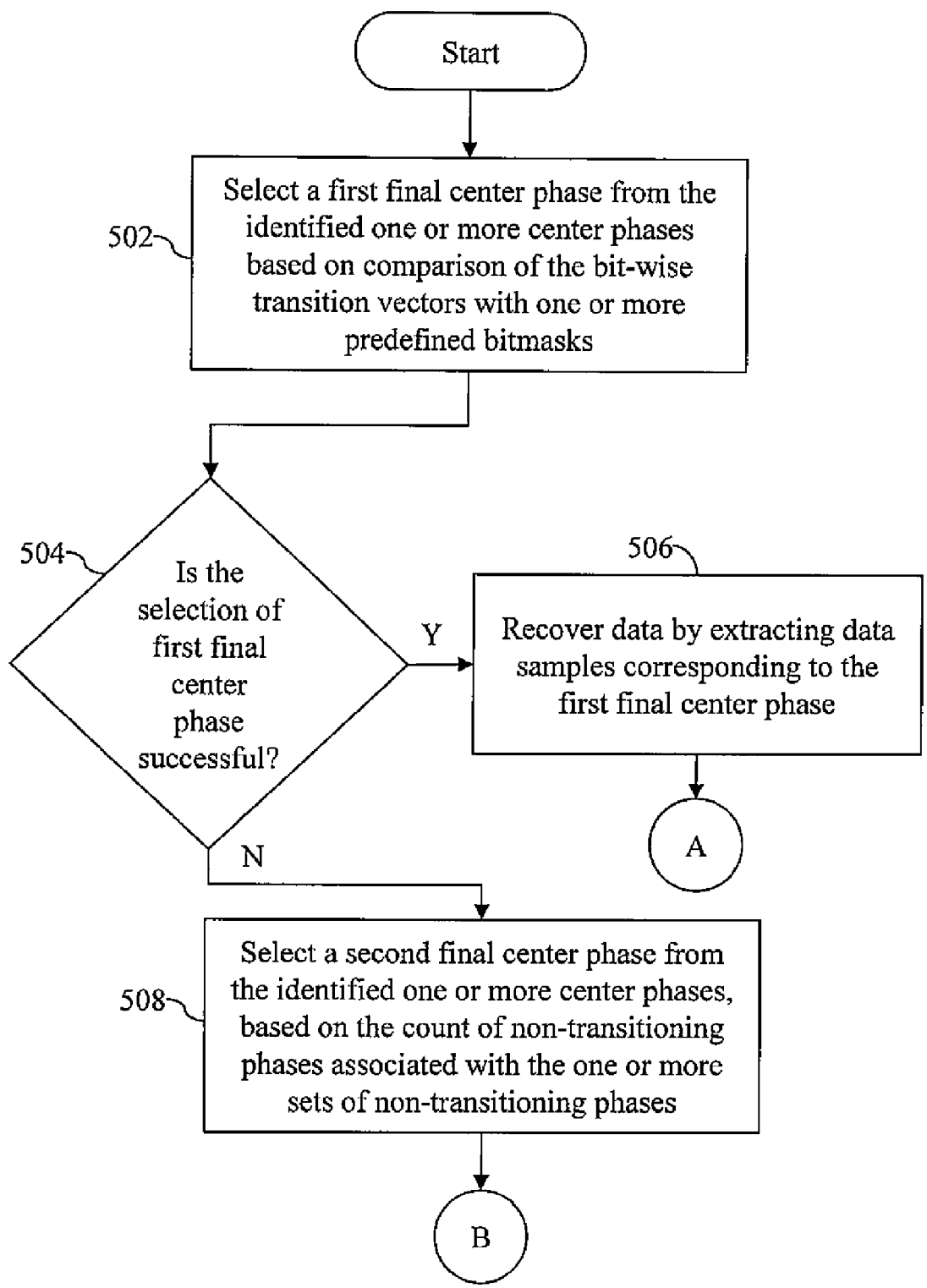
FIGS. 5A, 5B, and 5C are flowcharts illustrating a method for recovering clock and data from an input bit stream in accordance with another embodiment of the present invention.
Figure 5B:
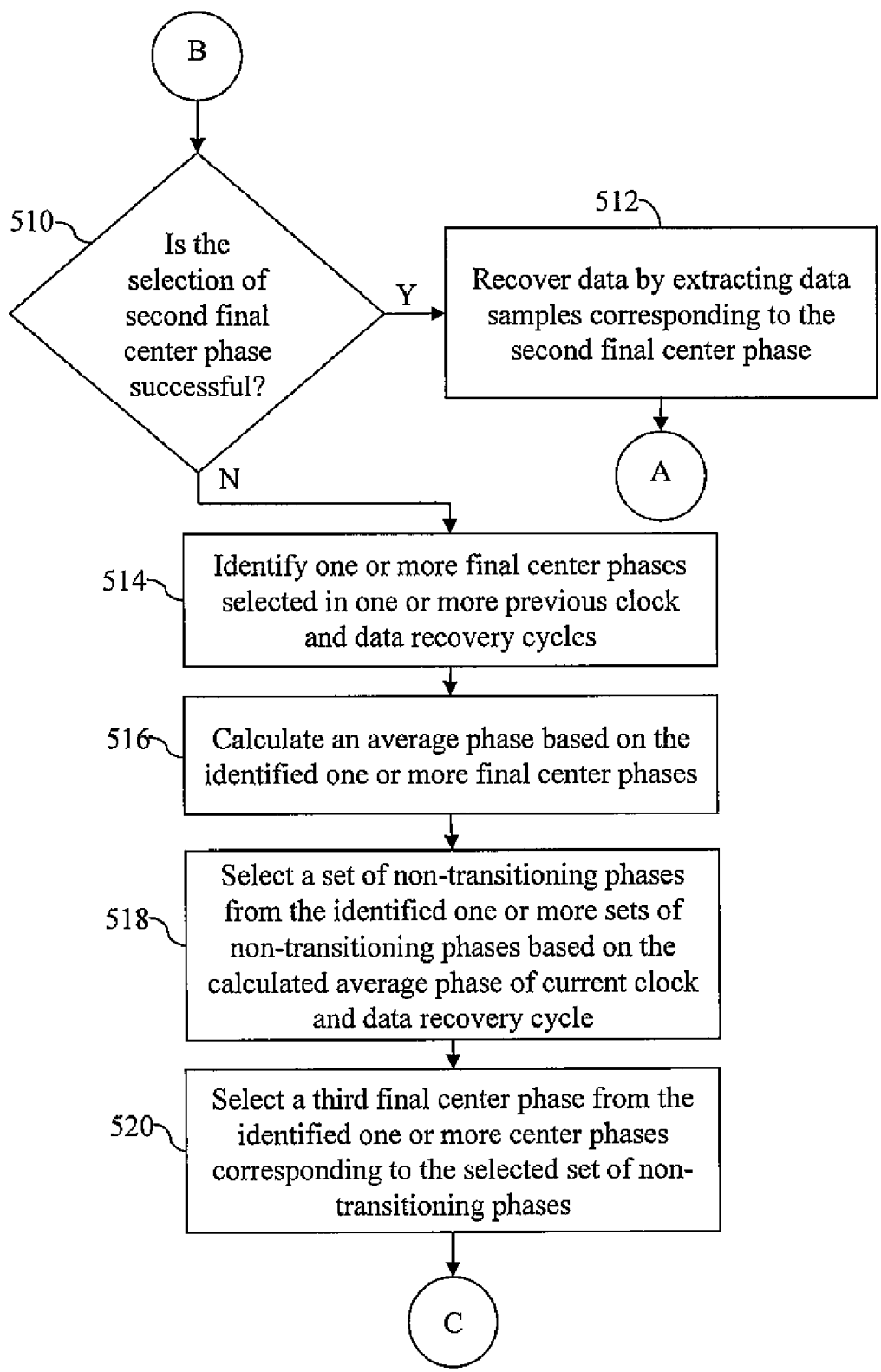
Figure 5C:
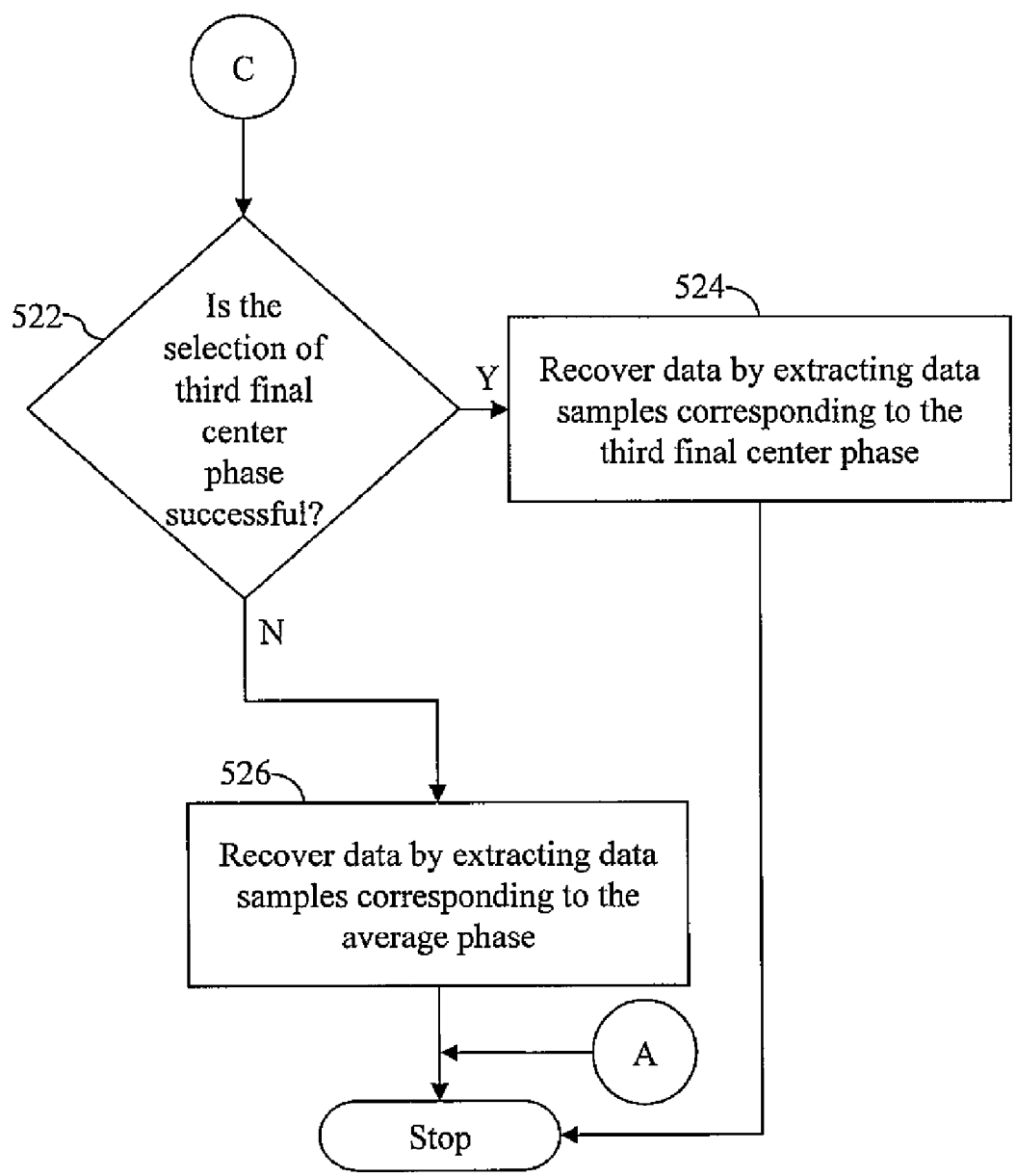

Referring now to FIGS. 5A, 5B, and 5C, a flowchart illustrating a detailed method for recovering clock and data from the input bit stream is shown, in accordance with another embodiment of the present invention. At step 502, a first final center phase is selected from the identified center phases based on comparison of the bit-wise transition vectors with one or more predefined bitmasks. It is noted here that the method steps executed before step 502 are the same as steps 402 to 410. Step 502 is similar to step 412, which has been explained in detail in conjunction with FIGS. 4A and 4B. At step 504, a check is performed to determine if the first final center phase is selected successfully at step 502. If, at step 504, it is determined that the first final center phase is selected successfully, step 506 is performed. At step 506, data samples are extracted corresponding to the first final center phase. The method followed in step 506 for the extraction of data samples is explained in detail in conjunction with step 416 of FIG. 4B. Subsequently, the method is terminated.

However, if, at step 504, it is determined that the first final center phase is not selected successfully, step 508 is performed. It should be understood by a person skilled in the art that the first final center phase may not be selected successfully if the predefined bitmasks do not match any of the sub-matrices obtained from a bit-wise transition matrix or the predefined bitmasks matches more than once for different rows of the bit-wise transition matrix. Additionally, there may be a possible scenario when the bitmasks match more than once for the same row i.e., for the same center phase. In such a scenario, the center phase is selected as the final center phase. At step 508, a second final center phase is selected from the identified center phases. The selection of the second final center phase is performed based on the count of non-transitioning phases associated with the non-transitioning zones. In an embodiment of the present invention, a center phase corresponding to a non-transitioning zone having the maximum count of non-transitioning phases is selected as the second final center phase. For example, suppose a phase-wise transition vector (PV) corresponding to a data sample matrix is

PV=[1, 0, 0, 1, 0, 0, 0, 1]

The bits contained in the phase-wise transition vector are such that the left most bit corresponds to phase 0 and the right most bit corresponds to phase 7.

Two non-transitioning zones corresponding to the phase-wise transition vector above may be identified. The first non-transitioning zone includes phases 1 and 2. The second non-transitioning zone includes phases 4, 5, and 6. Amongst the two identified non-transitioning zones, the second non-transitioning zone including phases 4, 5, and 6 is the longest zone, as the count of non-transitioning phases is 3 in this zone as compared to 2 in the other zone. The center phases corresponding to the first and second non-transitioning zones are phases 1 and 5, respectively. Since the count of the non-transitioning phases associated with the second non-transitioning zone is greater than the count of the non-transitioning phases associated with the first non-transitioning zone, the center phase corresponding to the second non-transitioning zone is selected as the second final center phase. At step 510, a check is performed to determine if the second final center phase is selected successfully at step 508. If, at step 510, it is determined that the second final center phase is selected successfully, step 512 is performed. At step 512, data samples are extracted corresponding to the second final center phase. The method followed in step 512 for the extraction of data samples is explained in detail in conjunction with step 416 of FIG. 4B. Subsequently, the method is terminated.

However, if, at step 510, it is determined that the second final center phase is not selected successfully, step 514 is performed. In an embodiment of the present invention, the second final center phase may not be selected successfully if two or more non-transitioning zones have same maximum count of non-transitioning phases associated with them. At step 514, final center phases selected in one or more previous clock and data recovery cycles are identified. In an embodiment of the present invention, the final center phases selected in the previous one or more clock and data recovery cycles are stored in a memory. At step 516, an average center phase of the one or more final center phases selected in one or more previous clock and data recovery cycles is calculated. In various embodiments of the present invention, the average center phase may be calculated by different statistical calculations such as a mean, a median, and a mode of the identified one or more final center phases. For example, suppose the identified final center phases selected in previous three clock and data recovery cycles are the phases 1, 2, and 5, then the average center phase calculated is (1+2+5)/3=phase 2. At step 518, a non-transitioning zone is selected from the identified non-transitioning zones of current clock and data recovery cycle using the calculated average center phase. The average center phase is compared with the non-transitioning phases present in the identified non-transitioning zones of current clock and data recovery cycle. Thereafter, the non-transitioning zone that includes the average center phase as one of the non-transitioning phases associated with it is selected for further calculations. For example, suppose the phase-wise transition vector for a data sample matrix be PV=[1, 0, 0, 1, 0, 0, 0, 1]. As explained earlier, the PV includes two non-transitioning zones. The first non-transitioning zone includes phases 1 and 2. The second non-transitioning zone includes phases 4, 5, and 6. Since, the calculated average center phase is phase 2 and the first non-transitioning zone includes phase 2, the first non-transitioning zone is selected. At step 520, a third final center phase from the identified one or more center phases is selected corresponding to the selected non-transitioning zone. At step 522, a check is performed to determine if the third final center phase is selected successfully at step 520. The non-transitioning zone will not be selected, if the calculated average center phase is not present in any of the non-transitioning zones. For example, suppose the phase-wise transition vector for a data sample matrix be PV=[1, 0, 0, 1, 0, 0, 0, 1]. As explained earlier, the PV includes two non-transitioning zones. The first non-transitioning zone includes phases 1 and 2. The second non-transitioning zone includes phases 4, 5, and 6. Further, if the calculated average center phase of previous clock and data recovery cycles be phase 3. Note that phase 3 is not present in any of the non-transitioning zones and therefore the non-transitioning zone will not be selected. This will lead to the third final centre phase not being selected. If, at step 522, it is determined that the third final center phase is selected successfully, step 524 is performed. At step 524, data samples are extracted corresponding to the third final center phase. The method followed in step 524 for the extraction of data samples is explained in detail in conjunction with step 416 of FIG. 4B. Subsequently, the method is terminated. However, if, at step 522, it is determined that the third final center phase is not selected successfully, step 526 is performed. Also, as explained earlier that the calculated average center phase may not be present in any of the non-transitioning zones and therefore the third final center phase may not be selected.

At step 526, data are recovered by extracting the data samples corresponding to the average center phase calculated in step 516. The method followed for the extraction of data samples in step 526 is explained in detail in conjunction with step 416 of FIG. 4B.

Figure 6:
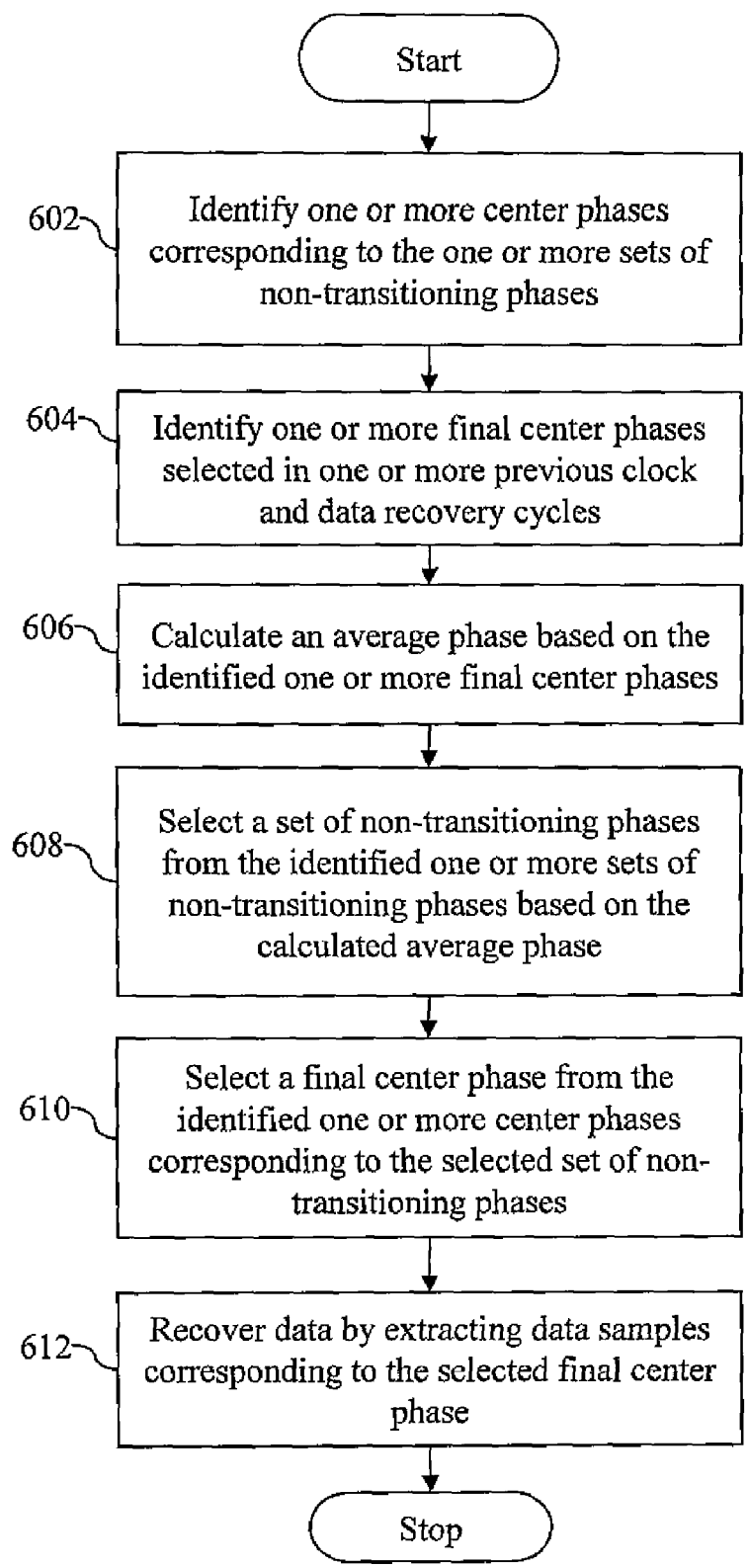
FIG. 6 is a flowchart illustrating a method for recovering clock and data from an input bit stream in accordance with yet another embodiment of the present invention.

Referring now to FIG. 6, a flowchart illustrating a method for recovering clock and data from the input bit stream is shown, in accordance with yet another embodiment of the present invention. At step 602, a center phase corresponding to each non-transitioning zone is identified. Step 602 is similar to step 408, which has been explained in detail in conjunction with FIGS. 4A and 4B. Note that the method steps executed before step 602 are the same as steps 402 to 406 described in detail in conjunction with FIGS. 4A and 4B.

At step 604, one or more final center phases selected in one or more previous clock and data recovery cycles are identified. Step 604 is similar to step 514, which has been explained in detail in conjunction with FIG. 5B. At step 606, an average center phase is calculated based on the one or more final center phases identified in previous clock and data recovery cycles. Step 606 is similar to step 516, which has been explained in detail in conjunction with FIG. 5B. At step 608, a non-transitioning zone is selected from the identified non-transitioning zones using the calculated average center phase of previous clock and data recovery cycles. Step 608 is similar to step 518, which has been explained in detail in conjunction with FIG. 5B. At step 610, a final center phase corresponding to the selected non-transitioning zone is selected from the identified one or more center phases. Step 610 is similar to step 520, which has been explained in detail in conjunction with FIG. 5B. At step 612, data are recovered by extracting the data samples corresponding to the selected final center phase.

Figure 7:
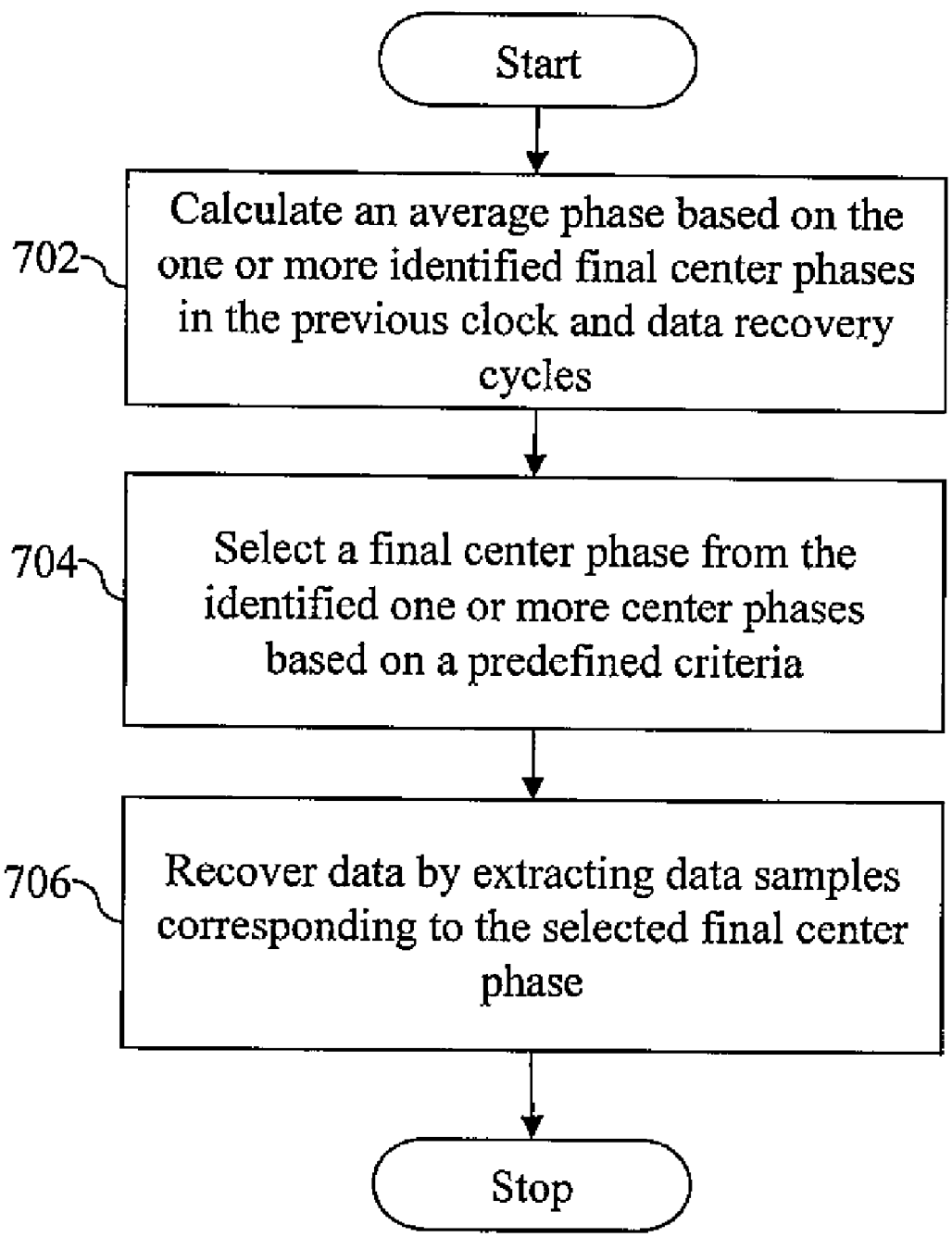
FIG. 7 is a flowchart illustrating a method for recovering clock and data from the input bit stream in accordance with still another embodiment of the present invention.

Referring now to FIG. 7, a flowchart illustrating a method for recovering clock and data from the input bit stream is shown, in accordance with still another embodiment of the present invention.

At step 702, an average center phase is calculated based on the one or more identified final center phases in the previous clock and data recovery cycles. Step 702 is similar to step 516, which has been explained in detail in conjunction with FIG. 5B. Note that the method steps executed before step 702 are the same as steps 402 to 410 described in detail in conjunction with FIGS. 4A and 4B and step 514 described in conjunction with FIG. 5B. At step 704, a final center phase is identified from the one or more center phases based on a predefined criteria. In an embodiment of the present invention, the predefined criteria may be a comparison of the bit-wise transition vectors with one or more predefined bitmasks. The method for comparing the bit-wise transition vectors with the one or more predefined bitmasks is explained in detail in conjunction with step 412 of FIG. 4B. In another embodiment of the present invention, the predefined criteria may comprise selecting a non-transitioning zone from the identified one or more non-transitioning zones based on the calculated average center phase. The method followed for selecting the non-transitioning zone is explained in conjunction with step 518 of FIG. 5B. At step 706, data are recovered by extracting the data samples corresponding to the selected final center phase.

Figure 8:
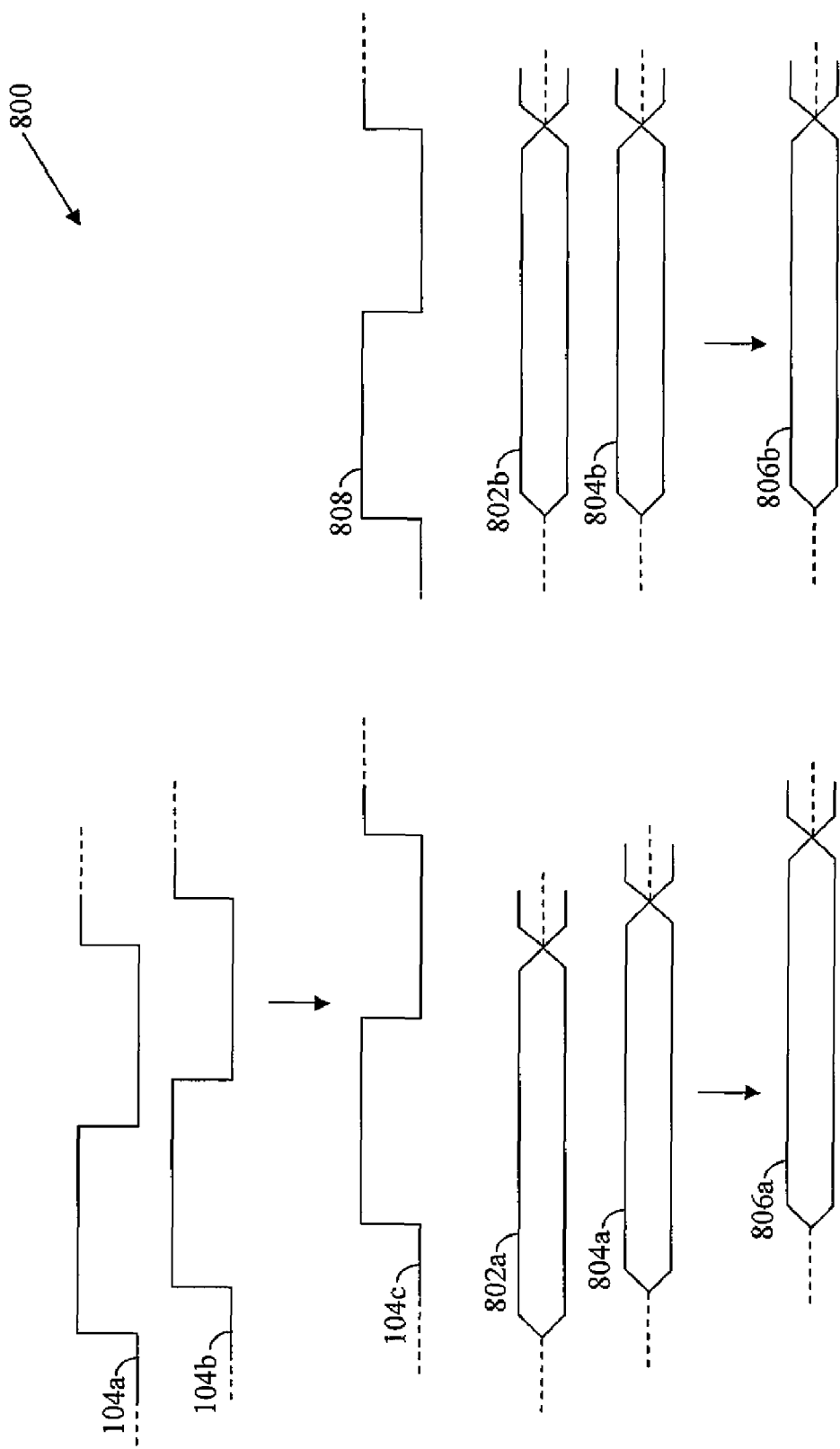
FIG. 8 is a timing diagram 800 illustrating a method of resynchronization in accordance with an embodiment of the present invention.

Referring now to FIG. 8, a timing diagram 800 illustrating a method of resynchronization is shown, in accordance with an embodiment of the present invention. The timing diagram 800 includes phase signals 104a, 104b, and 104c. Further, the timing diagram 800 includes data samples 802a, 804a, and 806a, resynchronized data samples 802b, 804b, and 806b, and a clock signal 808. FIG. 8 will be explained in detail in conjunction with FIG. 9.

Figure 9:
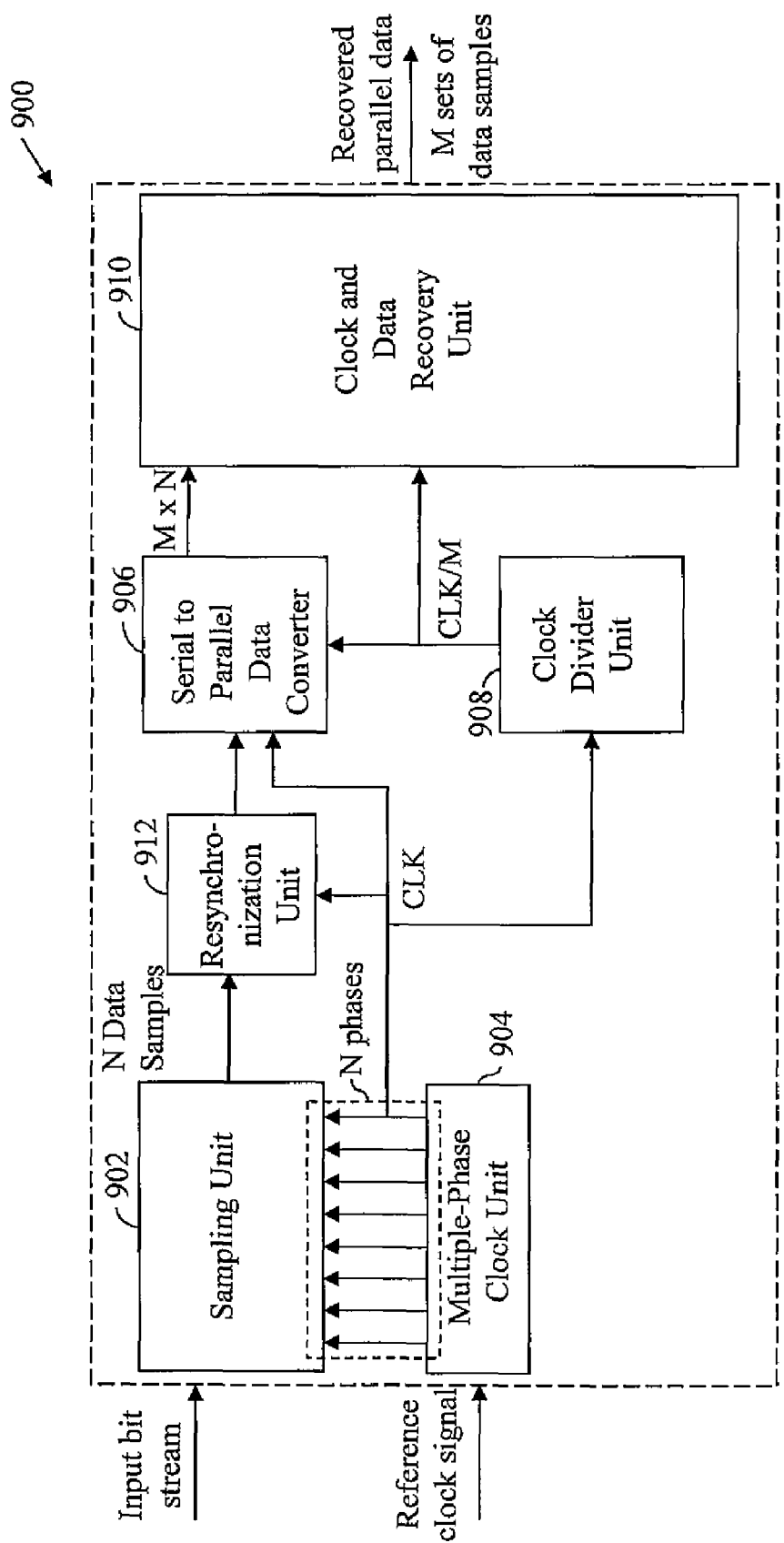
FIG. 9 is a receiver system in accordance with an embodiment of the present invention.

Referring now to FIG. 9, a schematic block diagram illustrating a receiver 900 for receiving an input bit stream is shown, in accordance with an embodiment of the present invention. The receiver 900 includes a sampling unit 902, a multi-phase clock unit 904, a serial-to-parallel data converter 906, a clock divider unit 908, a clock and data recovery unit 910, and a resynchronization unit 912.

The reference clock signal 102 (FIG. 1) is provided to the multiple-phase clock unit 904. The multiple-phase clock unit 904 generates a plurality of phases (phase signals 104a, 104b, and 104c) of the reference clock signal 102. In an embodiment of the present invention, the reference clock signal 102 is a high frequency clock of frequency 5 GHz. The multiple-phase clock unit 904 generates N phases of the reference clock signal 102, in which N is the number of data samples required to be obtained corresponding to one bit width of a received data belonging to the received input bit stream. Further, each set of data samples comprises a received data bit or contiguous portions of more than one received data bits corresponding to one bit duration of the received data. In various embodiments of the present invention, N may have any suitable positive integral value, such as eight. In an embodiment of the present invention, the multiple phases of the reference clock signal may be generated using a delayed locked loop (DLL) or a phase locked loop (PLL), or a phase interpolator, or a combination of these, as they provide correct phase shift to the high frequency reference clock signal to generate the multiple phases that are subsequently used for oversampling. For example, for four phase oversampling, 90° phase shift will be provided.

One of the N phases generated, having frequency equal to the reference clock signal 102, is provided to the clock divider unit 908 and also to the resynchronization unit 912 and to the serial to parallel data converter 906. The clock divider unit 908 produces a first clock signal that has a frequency which is 1/M times the frequency of the reference clock signal 102, in which M is the number of received data bits corresponding to which data is to be recovered in every cycle. For example, if the reference clock signal 102 has a frequency 5 GHz and M=10 then the frequency of the first clock signal generated by the clock divider unit 908 will be 500 MHz. Thereafter, the first clock signal generated is provided to the serial to parallel data converter 906 and the clock and data recovery unit 910.

The input bit stream is received by the sampling unit 902. The sampling unit 902 oversamples the received input bit stream to obtain one or more sets of data samples, such that each set of data samples includes data samples corresponding to one clock cycle of the reference clock signal 102 (Refer to FIG. 1). In an embodiment of the present invention, the sampling unit 902 includes a set of D flip-flops that sample the input bit stream on multiple clock phases generated by the multiple-phase clock unit 904. Thereafter, the data samples are provided to the resynchronization unit 912. The resynchronization unit 912 synchronizes the sampling instants of the data samples that belong to a particular set. Since the data samples obtained in one clock cycle of the reference clock signal 102 are obtained at different time instants (the data samples 802a, 804a, and 806a of FIG. 8), the resynchronization unit 912 time shifts the various obtained sets of data samples to align them to the clock signal 808 (the resynchronized data samples 802b, 804b, and 806b). As a result, the data samples that belong to one reference clock cycle are aggregated in a synchronized set of data samples.

After obtaining the synchronized set of data samples, the set of data samples is transferred to the serial to parallel data converter 906. The serial-to-parallel data converter 906 converts the serial stream of the sets of data samples into parallel streams of sets of data samples. The data samples in the sets of data samples correspond to the plurality of phases of reference clock signal. The serial-to-parallel data converter 906 provides the parallel streams of sets of data samples to the clock and data recovery unit 910 after one cycle of the first clock signal is complete. As the frequency of the first clock signal is 1/M times the reference clock signal 102, the serial-to-parallel data converter 906 transfers the parallel streams of sets of data samples to the clock and data recovery unit 910 when the count of sets of data samples becomes equal to M. As explained earlier, each set of data samples includes N data samples, thus the parallel streams of M sets of data samples includes M×N data samples. Since, the first clock signal is provided both to the serial to parallel data converter 906 and to the clock and data recovery unit 910, the transfer and receipt of the M×N data samples is synchronized.

Figure 10:
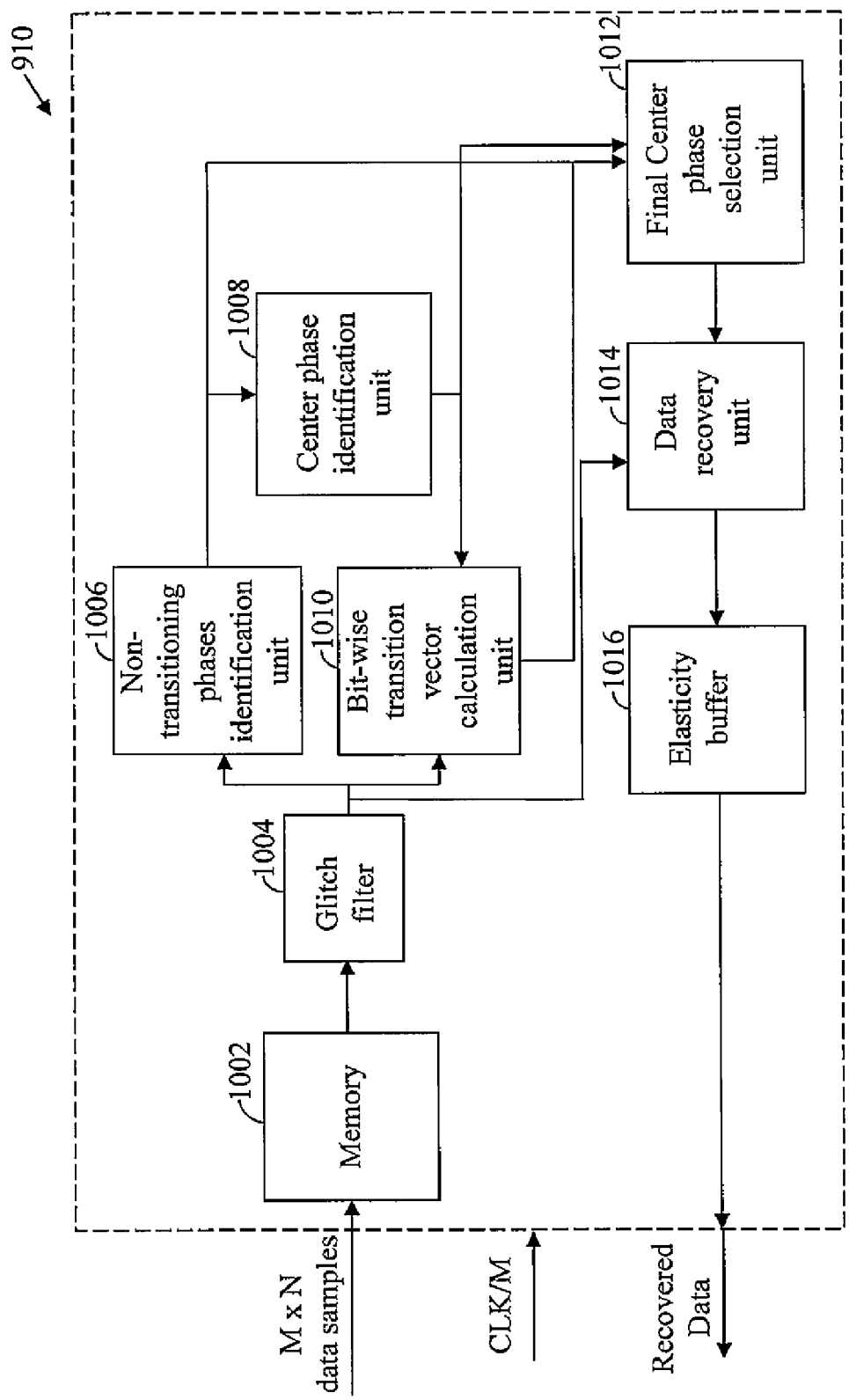
FIG. 10 is a clock and data recovery unit in accordance with an embodiment of the present invention.

Referring now to FIG. 10, a schematic block diagram illustrating the clock and data recovery unit 910 for recovering clock and data is shown, in accordance with an embodiment of the present invention. The clock and data recovery unit 910 includes a memory 1002, a glitch filter 1004, a non-transitioning phases identification unit 1006, a center phase identification unit 1008, a bit-wise transition vector calculation unit 1010, a final center phase selection unit 1012, a data recovery unit 1014, and an elasticity buffer 1016.

The parallel stream of M sets of data samples generated by the serial-to-parallel data converter 906 is provided to the clock and data recovery unit 910. As mentioned earlier, each set of data samples includes N data samples. Therefore, the parallelized sets of data samples include M×N data samples. Each of the M×N data samples is provided to the memory 1002 that stores them. In an embodiment of the present invention, the memory 1002 stores the data samples in a matrix format of M×N order. In an embodiment of the present invention, the memory 1002 may be a Random Access Memory (RAM), a flip-flop based memory or any other memory. Further, the non-transitioning phases identification unit 1006 identifies one or more non-transitioning zones corresponding to the data samples stored in the memory 1002. The identification of non-transitioning zones has been explained in detail in conjunction with FIGS. 4A and 4B. The identified non-transitioning zones are provided to the center phase identification unit 1008. The center phase identification unit 1008 identifies one or more center phases corresponding to the one or more non-transitioning zones identified by the non-transitioning phases identification unit 1006. Each center phase identified by the center phase identification unit 1008 corresponds to one non-transitioning zone identified by the non-transitioning phases identification unit 1006. The identification of the center phases is performed based on the count of non-transitioning phases present in a non-transitioning zone. The identification of center phases is described in detail in conjunction with FIGS. 4A and 4B.

The center phase identification unit 1008 provides the identified center phases to the bit-wise transition vector calculation unit 1010 and to the final center phase selection unit 1012. The bit-wise transition vector calculation unit 1010 calculates a bit-wise transition vector corresponding to each center phase identified by the center phase identification unit 1008. The bitwise transition vector captures transitions from one bit to a subsequent bit in a particular phase for a set of M data bits. The calculation of bit-wise transition vectors is described in detail in conjunction with FIGS. 4A and 4B. Further, the bit-wise transition vectors calculated by the bit-wise transition vector calculation unit 1010 are provided to the final center phase selection unit 1012. Additionally, the non-transitioning zones identified by the non-transitioning phases identification unit 1006 are provided to the final center phase selection unit 1012 Thereafter, the final center phase selection unit 1012 selects one center phase from the identified one or more center phases. The center phase is selected using the one or more methods described in conjunction with FIGS. 5A, 5B, and 5C.

A signal representing the selected final center phase is provided to the data recovery unit 1014. The data recovery unit 1014 extracts the data corresponding to the selected final center phase from the data samples stored in the memory 1002. For example, M data bits are extracted from the M×N data samples corresponding to the selected final center phase such that each data bit corresponds to a recovered bit from the input bit stream.

In an embodiment of the present invention, data transmission between the memory 1002 and other processing modules, such as the non-transitioning phases identification unit 1006 and the bit-wise transition vector calculation unit 1010, is routed through the glitch filter 1004. The glitch filter 1004 removes glitches from the data transmitted between the memory 1002 and other processing modules. In an embodiment of the present invention, the elasticity buffer 1016 is provided the data recovered by the data recovery unit 1014. The elasticity buffer 1016 helps in extracting the correct transmitted data at the receiver, if there is a relative frequency drift between transmitter & receiver serial clock frequency.

While various embodiments of the present invention have been illustrated and described, it will be clear that the present invention is not limited to these embodiments only. Numerous modifications, changes, variations, substitutions, and equivalents will be apparent to those skilled in the art, without departing from the spirit and scope of the present invention, as described in the claims.

The invention claimed is:

1. A method for recovering clock and data from an input bit stream, comprising:
   receiving the input bit stream;
   oversampling the received input bit stream using a plurality of phases of a reference clock signal to obtain one or more sets of data samples;
   identifying one or more sets of non-transitioning phases of the one or more sets of data samples;
   identifying one or more center phases corresponding to the one or more sets of non-transitioning phases, wherein a center phase corresponds to a set of non-transitioning phases;
   calculating one or more bit-wise transition vectors corresponding to the identified one or more center phases;
   comparing the one or more bit-wise transition vectors with one or more predefined bitmasks;
   selecting a first final center phase from the identified one or more center phases based on the comparison of the bit-wise transition vectors with the one or more predefined bitmasks; and
   recovering data by extracting data samples from the input bit stream corresponding to the selected first final center phase.

2. The method for recovering clock and data from an input bit stream of claim 1, wherein the one or more sets of non-transitioning phases are identified corresponding to data samples that do not switch between zero and one.

3. The method for recovering clock and data from an input bit stream method of claim 1, wherein the one or more bit-wise transition vectors are calculated based on transition of the data samples associated with the identified one or more center phases between zero and one.

4. The method for recovering clock and data from an input bit stream method of claim 1, wherein one or more center phases are determined based on a count of non-transitioning phases associated with the one or more sets of non-transitioning phases.

5. The method for recovering clock and data from an input bit stream of claim 4, further comprising selecting a second final center phase from the identified one or more center phases, based on the count of non-transitioning phases associated with the one or more sets of non-transitioning phases, wherein the second final center phase is selected based on the selection of the first final center phase.

6. The method for recovering clock and data from an input bit stream of claim 5, further comprising recovering data by extracting data samples corresponding to the selected second final center phase.

7. The method for recovering clock and data from an input bit stream of claim 1, further comprising identifying one or more final center phases selected in one or more previous clock and data recovery cycles.

8. The method for recovering clock and data from an input bit stream of claim 7, further comprising calculating an average center phase based on the identified one or more final center phases from previous clock and data recovery cycles.

9. The method for recovering clock and data from an input bit stream of claim 8, wherein the average center phase comprises at least one of a mean, a median, and a mode of the identified one or more final center phases from previous clock and data recovery cycles.

10. The method for recovering clock and data from an input bit stream of claim 9, further comprising selecting a set of non-transitioning phases from the identified one or more sets of non-transitioning phases of the current clock and data recovery cycle based on the calculated average center phase.

11. The method for recovering clock and data from an input bit stream of claim 10, further comprising selecting a third final center phase from the identified one or more center phases corresponding to the selected set of non-transitioning phases of current clock and data recovery cycle, wherein the third final center phase is selected based on selection of the second final center phase.

12. The method for recovering clock and data from an input bit stream of claim 11, further comprising recovering the clock and data by extracting data samples corresponding to the selected third final center phase.

13. The method for recovering clock and data from an input bit stream of claim 8, further comprising recovering the clock and data by extracting data samples corresponding to the average center phase.

14. A method for recovering clock and data from an input bit stream, comprising:
  receiving the input bit stream;
  oversampling the received input bit stream using a plurality of phases of a reference clock signal to obtain one or more sets of data samples, wherein each set of data samples corresponds to one bit width of received data of the received input bit stream, and wherein each set of data samples includes one of a received data bit and contiguous portions of more than one received data bit corresponding to one bit duration of the received data;
  identifying one or more sets of non-transitioning phases corresponding to data samples that do not switch between zero and one;
  identifying one or more center phases corresponding to the one or more sets of non-transitioning phases, wherein a center phase corresponds to a set of non-transitioning phases, and wherein each center phase is determined based on a count of non-transitioning phases associated with the one or more sets of non-transitioning phases;
  identifying one or more final center phases selected in one or more previous clock and data recovery cycles;
  calculating an average center phase based on the identified one or more final center phases in previous clock and data recovery cycles;
  selecting a set of non-transitioning phases from the identified one or more sets of non-transitioning phases in the current clock and data recovery cycle based on the calculated average center phase;
  selecting a first final center phase from the identified one or more center phases corresponding to the selected set of non-transitioning phases; and
  recovering data by extracting data samples corresponding to the selected first final center phase.

15. The method for recovering clock and data from an input bit stream of claim 14, wherein the average center phase comprises at least one of a mean, a median, and a mode of the identified one or more final center phases.

16. The method for recovering clock and data from an input bit stream of claim 15, further comprising recovering data by extracting data samples corresponding to the calculated average center phase in previous clock and data recovery cycles.

17. A receiver system for recovering clock and data from an input bit stream, comprising:
  a sampling unit for receiving the input bit stream and oversampling the received input bit stream using a plurality of phases of a reference clock signal to obtain one or more sets of data samples, wherein each set of data samples corresponds to one bit width of received data of the received input bit stream, and wherein each set of data samples comprises a received data bit or contiguous portions of more than one received data bit corresponding to one bit duration of the received data;
  a serial to parallel data converter, connected to the sampling unit, for converting a serial stream of the one or more sets of data samples into one or more parallel streams of sets of data samples;
  a clock and data recovery unit, connected to the serial to parallel data converter, for recovering clock and data from the one or more parallel streams of sets of data samples, wherein the clock and data recovery unit comprises:
    a memory for storing the parallel streams of sets of data samples;
    a non-transitioning phases identification unit, connected to the memory, for identifying one or more sets of non-transitioning phases corresponding to data samples that do not switch between zero and one;
    a center phase identification unit, connected to the non-transitioning phases identification unit, for identifying one or more center phases corresponding to the one or more sets of non-transitioning phases, wherein a center phase corresponds to a set of non-transitioning phases, and wherein each of the identified one or more center phases is determined based on a count of non-transitioning phases associated with the identified one or more sets of non-transitioning phases;
    a bit-wise transition vector calculation unit, connected to the center phase identification unit and the memory, for identifying one or more bit-wise transition vectors corresponding to the identified one or more center phases, based on switching of the data samples associated with the identified one or more center phases between zero and one;
    a final center phase selection unit, connected to the bit-wise transition vector calculation unit, for selecting a final center phase from the identified one or more center phases for recovering data; and a data recovery unit, connected to the final center phase selection unit and the memory, for recovering data by extracting data samples corresponding to the selected final center phase.

18. The receiver system of claim 17, wherein the clock and data recovery unit further comprises a glitch filter, connected to the memory, for eliminating glitches from the parallel streams of sets of data samples.

19. The receiver system of claim 17, wherein the clock and data recovery unit further comprises an elasticity buffer, connected to the data recovery unit, for maintaining synchronous data transmission between a transmitter system and the receiver system in a presence of a frequency drift.

20. The receiver system of claim 17, wherein the sampling unit further comprises a resynchronization unit for synchronizing sampling instants of the plurality of sets of data samples.

* * * * *